United States Patent
Kini et al.

(10) Patent No.: US 8,472,438 B2
(45) Date of Patent: Jun. 25, 2013

(54) EFFICIENT ENCAPSULATION OF PACKETS TRANSMITTED ON A PACKET-PSEUDOWIRE OVER A PACKET SWITCHED NETWORK

(75) Inventors: Sriganesh Kini, Fremont, CA (US); David Sinicrope, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 259 days.

(21) Appl. No.: 12/824,072

(22) Filed: Jun. 25, 2010

(65) Prior Publication Data

US 2011/0261812 A1    Oct. 27, 2011

Related U.S. Application Data

(60) Provisional application No. 61/327,281, filed on Apr. 23, 2010.

(51) Int. Cl.
*H04L 12/28* (2006.01)

(52) U.S. Cl.
USPC ........................................................ 370/389

(58) Field of Classification Search
None
See application file for complete search history.

(56) References Cited

U.S. PATENT DOCUMENTS

| | | | |
|---|---|---|---|
| 6,791,947 B2 * | 9/2004 | Oskouy et al. | 370/238 |
| 7,376,125 B1 * | 5/2008 | Hussain et al. | 370/352 |
| 7,894,450 B2 * | 2/2011 | Unbehagen et al. | 370/395.3 |
| 2009/0059914 A1 * | 3/2009 | Khalid et al. | 370/389 |
| 2010/0189118 A1 * | 7/2010 | Nonaka | 370/401 |
| 2010/0309915 A1 * | 12/2010 | Pirbhai et al. | 370/392 |

OTHER PUBLICATIONS

J. Reynolds, J. Postel, "Assigned Numbers", RFC 1700, Internet Society, Network Working Group, Oct. 1994, pp. 1-2 and 168-171.*
E. Rosen, A. Viswanathan, R. Callon, "Multiprotocol Label Switching Architecture," RFC 3031, Internet Society, Network Working Group, Jan. 2001.*
M. Lasserre, V. Kompella, "Virtual Private LAN Service (VPLS) Using Label Distribution Protocol (LDP) Signaling", RFC 4762, Internet Society, Network Working Group, Jan. 2007.*
David C. Plummer, Network Working Group, RFC 826, An Ethernet Address Resolution Protocol, Nov. 1982, 11 pages.

(Continued)

*Primary Examiner* — Dang Ton
*Assistant Examiner* — Ronald H Davis
(74) *Attorney, Agent, or Firm* — Blakely, Sokoloff, Taylor & Zafman LLP

(57) ABSTRACT

Improving efficiency of encapsulation for packets of a first set of one or more protocols on a packet-pseudowire over a tunnel in a Packet Switched Network (PSN) is described. A first provider edge (PE) network element is coupled with a customer edge (CE) network element over an attachment circuit and is coupled with a second PE network element over the packet-pseudowire. The first provider edge network element receives a frame from the CE network element over the attachment circuit. Responsive to the first PE network element determining that the frame encapsulates a packet of the first set of protocols, the first PE network element encapsulates the packet into a protocol data unit for transmission over the packet-pseudowire without including substantially all of the plurality of fields of the data link layer header. The first PE network element transmits the protocol data unit over the packet-pseudowire over the PSN tunnel to the second PE network element. Efficiency is improved through a reduction of overhead on the packet-pseudowire by removing substantially all the fields of the data link layer header of the first frame.

13 Claims, 16 Drawing Sheets

OTHER PUBLICATIONS

Carl-Mitchell et al., Network Working Group, RFC 1027, Using ARP to Implement Transparent Subnet Gateways, Oct. 1987, 9 pages.

K. Nichols, Network Working Group, RFC 2474, Definition of the Differentiated Services Field (DS Field)in the IPv4 and IPv6 Headers, Dec. 1998, 21 pages.

D. Farinacci et al., Network Working Group, RFC 2784, Generic Routing Encapsulation (GRE), Mar. 2000, 10 pages.

S. Bryant et al., Network Working Group, RFC 3985, Pseudo Wire Emulation Edge-to-Edge (PWE3) Architecture, Mar. 2005, 43 pages.

S. Bryant et al., Network Working Group, RFC 4385, Pseudowire Emulation Edge-to-Edge (PWE3)Control Word for Use over an MPLS PSN, Feb. 2006, 13 pages.

L. Martini et al., Network Working Group, RFC 4448, Encapsulation Methods for Transport of Ethernet over MPLS Networks, Apr. 2006, 25 pages.

A. Malis et al., Network Working Group, RFC 4623, Pseudowire Emulation Edge-to-Edge (PWE3) Fragmentation and Reassembly, Aug. 2006, 18 pages.

T. Nadeau et al., Network Working Group, RFC 5085, Pseudowire Virtual Circuit Connectivity Verification (VCCV):A Control Channel for Pseudowires, Dec. 2007, 31 pages.

M. Bocci et al., Network Working Group, RFC 5659, An Architecture for Multi-Segment Pseudowire Emulation Edge-to-Edge, Oct. 2009, 25 pages.

S. Bryant et al., Flow Aware Transport of Pseudowires over an MPLS PSN, draft-ietf-pwe3-fat-pw-03, Internet-Draft, PWE3, Jan. 27, 2010, 20 pages.

Packet size distribution comparison between Internet links in 1998 and 2008, CAIDA the Cooperative Association for Internet Data Analysis, http://www.caida.org/research/traffic-analysis/pkt_size_distribution/graphs.xml, downloaded Jun. 17, 2010, 5 pages.

Virtual Bridged Local Area Networks, IEEE Std 802.1Q-2005, IEEE Standard for Local and metropolitan area networks, IEEE Computer Society, May 19, 2006, 303 pages.

Virtual Bridged Local Area Networks, Amendment 4: Provider Bridges, IEEE Std 802.1ad-2005, IEEE Standard for Local and metropolitan area networks, IEEE Computer Society, May 26, 2006, 74 pages.

Station and Media Access Control Connectivity Discovery, IEEE Std 802.1AB, IEEE Standard for Local and metropolitan area networks, IEEE Computer Society, May 6, 2005, 172 pages.

Information technology—Telecommunications and information exchange between systems—Intermediate System to Intermediate System intra-domain routeing information exchange protocol for use in conjunction with the protocol for providing the connectionless-mode network service (ISO 8473), International Standard, ISO/IEC 10589, Second edition, Nov. 15, 210 pages.

Martini et al.: "Encapsulation Methods for Transport of Layer 2 Frames over MPLS Networks; rfc4905.txt", IETF Standard, Internet Engineering Task Force, IETF, CH, Jun. 1, 2007, XP015052443, ISSN: 0000-0003, 21 pages.

Shah et al.: "IP-Only LAN Service (IPLS); draft-ietf-12vpn-ipls-09. txt", Internet Engineering Task Force, IETF; Standard Working Draft, Internet Society (ISOC) 4, Rue Des Falaises CH—1205 Geneva, Switzerland, No. 9, Mar. 1, 2010, pp. 1-30, XP015067581, [retrieved on Mar. 1, 2010].

Kini et al.: "Encapsulation Methods for Transport of packets over an MPLS PSN—efficient for IP/MPLS; draft-kini-pwe3-pkt-encap-efficient-ip-mpls-02.tx", Draft-KINI-PWE3-PKT-Encap-Efficient-IP-MPLS-02.TX Internet Engineering Task Force, IETF; Standard Working Draft, Internet Society (ISOC) 4, Rue Des Falaises CH—12, No. 2, Mar. 14, 2011, pp. 1-26, XP015074860, [retrieved on Mar. 14, 2011].

\* cited by examiner

```
+----------------------------------------------------+
|PSN Tunnel & PSN Physical Headers                   | m octets
|----------------------------------------------------|
|PW Label (S=0 if FAT-PW label present, else S=1)    | 4
|----------------------------------------------------|
|Optional FAT-PW label S=1                           | 4
|----------------------------------------------------|
|IPv4 header (GRE Delivery header)                   | 20
|   IPv4 protocol field=47(GRE)                      |
|   TTL=1                                            |
|                                                    |
|   Dst Addr 127/8                                   |
|----------------------------------------------------|
| GRE Header                                         | 8
|                                                    |
+----------------------------------------------------+
| GRE Payload Packet - any arbitrary protocol        | n octets
.                                                    .
.                                                    .
.                                                    .
|                                                    |
+----------------------------------------------------+
```

FIG. 11

```
+----------------------------------------------------+
|PSN Tunnel & PSN Physical Headers                   | m octets
|----------------------------------------------------|
|PW Label (S=0 if FAT-PW label present, else S=1)    | 4
|----------------------------------------------------|
|Optional FAT-PW label S=1                           | 4
|----------------------------------------------------|
|Control Word with Flags bits 6,7 set to 00          | 4
|----------------------------------------------------|
|Ethernet frame of an arbitrary protocol             | n octets
.                                                    .
.                                                    .
.                                                    .
|                                                    |
+----------------------------------------------------+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|F|   Local MAC addr (TBA)      |           Length=6           |
+-+-+-+-+-+-+-+-+-+-+-+-+-+-+-+-+-+-+-+-+-+-+-+-+-+-+-+-+-+-+-+-+
|                    Local MAC address                           |
|                               +-+-+-+-+-+-+-+-+-+-+-+-+-+-+-+-+
|                               |
+-+-+-+-+-+-+-+-+-+-+-+-+-+-+-+-+
```

FIG. 13

```
+------------------------------------------------+
|PSN-n Tunnel & PSN Physical Headers             | n octets
|------------------------------------------------|
|PW-n Label (S=1)                                | 4
|------------------------------------------------|
|PW-n Optional FAT-PW label                      | 4
|------------------------------------------------|
|PW-n Control Word                               | 4
|------------------------------------------------|
| Ethernet Frame (AC-n) header                   | 14/18/22
.                                                . untag/single-
.                                                . tag/double-tag
|------------------------------------------------|
|PSN-n+1 Tunnel label                            | 4
|------------------------------------------------|
|PW-n+1 Label (S=1)                              | 4
|------------------------------------------------|
|PW-n+1 Optional FAT-PW label                    | 4
|------------------------------------------------|
|PW-n+1 Control Word                             | 4
|------------------------------------------------|
| Ethernet Frame (AC-n+1) header                 | 14/18/22
.                                                . untag/single-
.                                                . tag/double-tag
|------------------------------------------------|
|IP v4/v6 packet                                 | n octets
.                                                .
.                                                .
|                                                |
+------------------------------------------------+
```

PRIOR ART
FIG. 16

EFFICIENT ENCAPSULATION OF PACKETS TRANSMITTED ON A PACKET-PSEUDOWIRE OVER A PACKET SWITCHED NETWORK

CROSS-REFERENCE TO RELATED APPLICATIONS

This application claims the benefit of U.S. Provisional Application No. 61/327,281, filed Apr. 23, 2010, which is hereby incorporated by reference.

FIELD

Embodiments of the invention relate to the field of networking; and more specifically, to efficient encapsulation of packets transmitted on a packet-pseudowire over a packet switched network.

BACKGROUND

A packet transport service described in RFC (Request For Comments) 3985, "Pseudo Wire Emulation Edge-to-Edge (PWE3) Architecture", March 2005 describes a packet transport service that emulates a telecommunications service (e.g., Ethernet, Frame Relay, ATM (Asynchronous Transfer Mode), TDM (Time-division multiplexing), SONET/SDH (Synchronous Optical Networking/Synchronous Digital Hierarchy)) over a PSN (Packet Switched Network) (e.g., an MPLS (Multiprotocol Label Switching) including a MPLS-TP (Transport Profile) PSN). In a general network model, the service is emulated between customer edge network elements that communicate over the PSN through one or more pseudowires provided by provider edge network elements. A network element (e.g., a router, switch, bridge) is a piece of networking equipment, including hardware and software, that communicatively interconnects other equipment on the network (e.g., other network elements, end stations such as subscriber end stations and server end stations). A customer edge network element is a network element where one end of the service originates and/or terminates, and is typically unaware that the service is being emulated. Each customer edge network element is coupled to a provider edge network element through an attachment circuit (AC), which is a physical or virtual circuit (e.g., Frame Relay DLCI (data link connection identifier), ATM VPI/VCI (Virtual Path Identifier/Virtual Circuit Identifier), Ethernet, VLAN (Virtual Local Area Network), etc.). The provider edge network elements are coupled together through one or more pseudowires. A PSN tunnel is established to provide a data path for the pseudowires. The pseudowire traffic is invisible to the core network (e.g., one or more intermediate provider network elements between provider edge network elements). Native data units (e.g., Ethernet frames) are received on the attachment circuits and are encapsulated in pseudowire-protocol data units (PW-PDUs) n to be carried across the PSN via the pseudowires in the PSN tunnel. The provider edge network elements perform the encapsulation and decapsulation of PW-PDUs.

A pseudowire which is able to carry any number and type of protocols is a packet-pseudowire and may have unique control word and other embedded encodings. These protocols may include control protocols (e.g., ARP (Address Resolution Protocol), LLDP (Link Layer Discovery Protocol), etc.) and/or other client protocols such as IP and MPLS. In certain network deployments, client protocols such as IP and MPLS take up the majority of the bandwidth of the service compared to the control protocols.

There have been several different approaches that have been suggested for encapsulation formats for a packet-pseudowire, described in IETF draft "Packet Pseudowire Encapsulation over an MPLS PSN", draft-bryant-pwe3-packet-pw-03, Mar. 8, 2010 (hereinafter "draft-bryant"). The encapsulation format recommended by draft-bryant proposes a technique using virtual Ethernet to provide a packet-pseudowire and use an Ethernet pseudowire (described in RFC 4448, "Encapsulation Methods for Transport of Ethernet over MPLS Networks", April 2006) to carry the user traffic. An Ethernet pseudowire carries all the data link layer headers, regardless of whether the underlying protocol is a control protocol or a client protocol such as IP and MPLS.

SUMMARY

An efficient encapsulation format for IP and/or MPLS protocols on a packet-pseudowire (PPW) over a packet switched network (PSN) is described. A first provider edge (PE) network element is coupled between a locally coupled customer edge (CE) network element over an attachment circuit and a second provider edge network element over the PPW. The first PE receives a frame from the CE network element over the attachment circuit, the frame including a data link layer header having multiple fields. The first PE determines that the frame encapsulates an IP packet or an MPLS packet and then encapsulates the packet into a protocol data unit (PDU) for transmission on the PPW without including substantially all or each of the fields the entire data link layer header. The PDU is transmitted on the PPW to the second provider edge network element. Efficiency is improved through a reduction of overhead on the PPW through removal of substantially all of the fields or the entire data link layer header of the frame. The reduction of overhead for transmitting IP and MPLS packets on the PPW also reduces the possibility of fragmentation (and the required assembly) for those IP and MPLS packets thereby increasing throughput.

The second PE network element receives the PDU that has omitted substantially all of the fields or the entire data link layer header from the PDU on the PPW. The second PE network element determines that the packet payload of the PDU is either an IP packet or an MPLS packet, and then maps the packet into a frame by adding those fields of the data link layer header that were omitted from the PDU for transmission to a CE network element that is locally coupled to the second PE network element. The second PE network element then transmits the frame to its locally coupled CE network element. Efficiency is improved through omission of substantially all or each of the fields the data link layer header for PDUs that have IP or MPLS payloads, and reconstruction of those omitted fields for transmission to the CE network element locally coupled to the second PE network element.

BRIEF DESCRIPTION OF THE DRAWINGS

The invention may best be understood by referring to the following description and accompanying drawings that are used to illustrate embodiments of the invention. In the drawings:

FIG. 11 illustrates an exemplary encapsulation format of a non-IP/MPLS packet encapsulated into PPW without control word processing being used according to one embodiment of the invention;

FIG. 12 illustrates an exemplary encapsulation format of a non-IP/MPLS packet encapsulated into PPW with control word processing being used according to one embodiment of the invention;

FIG. 13 illustrates an exemplary format of a locally connected MAC address TLV used to signal MAC addresses of a locally connected CE network element to a peer PE network element according to one embodiment of the invention;

FIG. 16 illustrates a prior art encapsulation format for the multi-layer network of FIG. 15;

DESCRIPTION OF EMBODIMENTS

Figure 1:
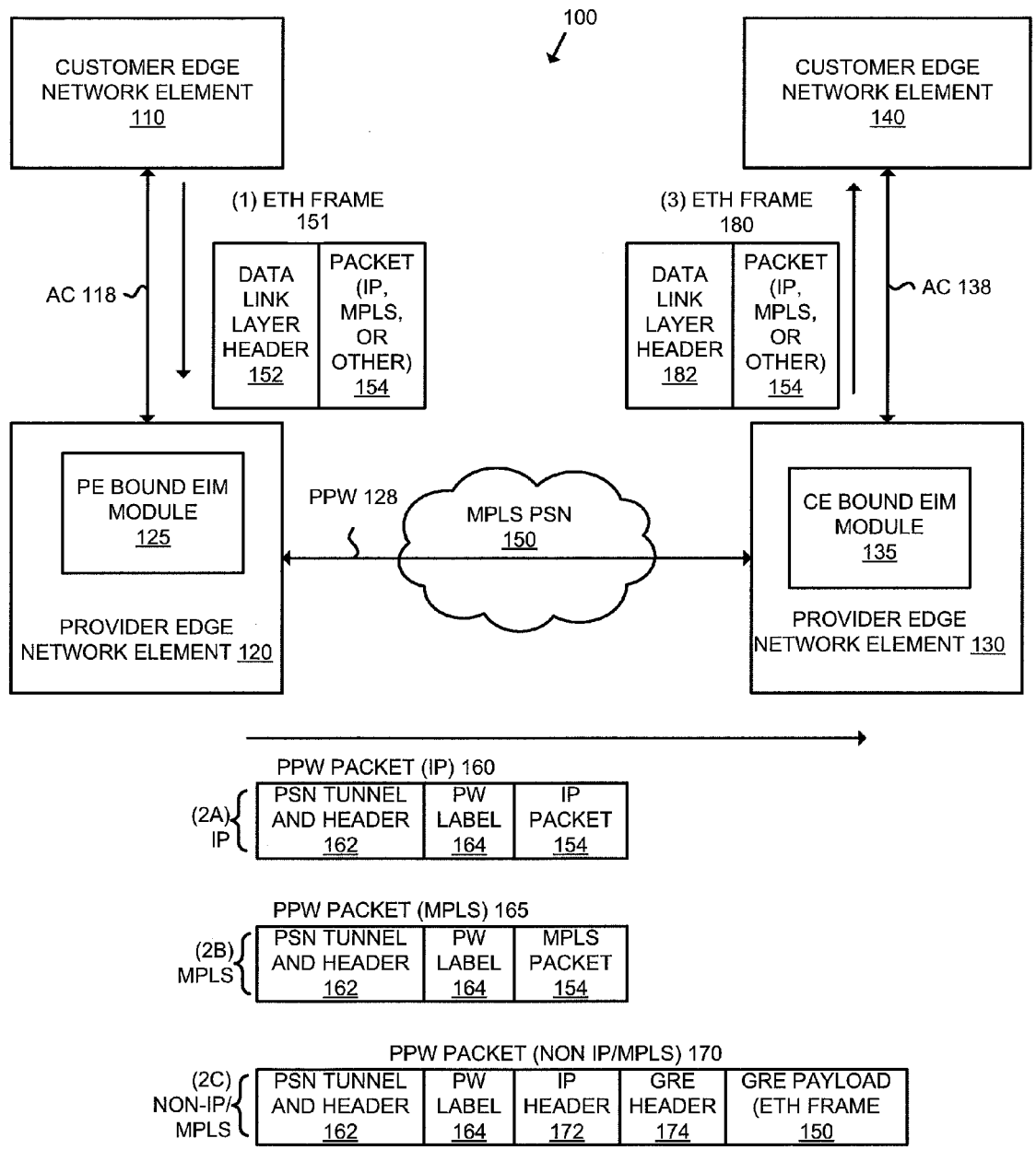
FIG. 1 illustrates an exemplary network implementing an efficient IP and MPLS encapsulation format for a packet-pseudowire (PPW) while allowing for other protocol types on the PPW according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled" along with its derivatives, may be used. "Coupled" is used to indicate that two or more elements, which may or may not be in direct physical or electrical contact with each other, co-operate or interact with each other.

A method and apparatus for an efficient IP (Internet Protocol) and MPLS (Multiprotocol Label Switching) encapsulation format for a packet-pseudowire (PPW) over a PSN (packet switched network), while allowing for other protocol types on the PPW is described. In one embodiment, the encapsulation format does not use substantially all of the fields of the data link layer header (e.g., Ethernet header) on the PPW to transport IP or MPLS packets. This reduces the number of overhead bytes on the PPW, which leads to a significant reduction in bandwidth (as a percentage of packet size) as a result of smaller packets. Thus, more packet payloads using the same bandwidth may be carried on the PPW by eliminating the data link layer header to transport IP or MPLS packets.

The encapsulation format for IP and MPLS packets also supports using control words on the PPW (described in RFC 4385, "Pseudowire Emulation Edge-to-Edge (PWE3) Control Word for Use over an MPLS PSN", February 2006). Control word processing provides the ability to prevent re-ordering within a packet flow by preventing ECMP (equal-cost multi-path) treatment on the PPW in the PSN, and is established during negotiation of the PPW. ECMP is a distributed load sharing mechanism that routes packets along multiple paths of equal cost in the PSN in order to distribute the load.

In addition, while improving the efficiency of encapsulation for IP and MPLS packets on the PPW, other non-IP and non-MPLS (non-IP/MPLS) packets are supported on the PPW. In contrast to the encapsulation format for IP and MPLS packets on the PPW, the encapsulation format for non-IP/MPLS packets includes the entire data link layer header. The encapsulation format for non-IP/MPLS packets also supports using control words on the PPW. When control word processing is not used, frames that encapsulate non-IP/MPLS packets are encapsulated in a GRE (Generic Routing Encapsulation) packet using IP as a delivery header. This allows ECMP, based on IP (looking for an IP packet beyond the MPLS label stack) to be implemented on such packets without being subject to flow re-ordering, thereby obviating the need for using control words or using other flow re-ordering techniques (e.g., flow labels).

FIG. 1 illustrates an exemplary network 100 implementing an efficient IP and MPLS encapsulation format for a packet-pseudowire (PPW) over a PSN while allowing for other protocol types on the PPW. The network 100 includes the customer edge (CE) network elements 110 and 140, which are coupled to the provider edge (PE) network elements 120 and 130 through the attachment circuits 118 and 138. In one embodiment, the attachment circuits 118 and 138 are Ethernet virtual circuits. The attachment circuits 118 and 138 may be tagged or untagged. Untagged traffic is treated as a unique Ethernet virtual circuit. The stack of VLAN identifiers (VIDs) in the VLAN tags stack of an Ethernet frame will uniquely identify the Ethernet virtual circuit. The number of VIDs in the stack identifying the Ethernet virtual circuit can be one (e.g., as in 802.1q) or more (e.g., as in 802.1ad). The PE network elements 120 and 130 are coupled together over the PPW 128 being carried over the MPLS PSN (Packet Switched Network) 150. The PPW 128 is a point-to-point (p2p) link and is capable of carrying any type of protocol, and as such, any control word and other embedded encodings are unique to the PPW. Although not illustrated in FIG. 1, the PPW 128 is carried over a PSN tunnel through the MPLS PSN 150. In addition, the MPLS PSN 150 includes one or more intermediate network elements (sometimes referred to as provider (P) network elements). In addition, while the PSN 150 is illustrated as an MPLS PSN, other types of PSN may be used in embodiment of the invention (e.g., MPLS-TP).

FIG. 1 also illustrates a sample flow and encapsulation of packets on the PPW. As illustrated in FIG. 1, the CE network element 110 acts as an ingress CE network element (a source of packets to be encapsulate on the PPW 128) and the CE network element 140 acts as an egress CE network element (the destination of packets encapsulated on the PPW 128). The PE network element 120 acts as an ingress PE network element and includes the PE bound EIM (Efficient IP and MPLS) module 125 to encapsulate packets on the PPW 128. The PE network element 130 acts as an egress PE network element and includes the CE bound EIM module 135 to decapsulate packets on the PPW 128. It should be understood that in some embodiments the PE network element 130 also includes a PE bound EIM module to encapsulate packets on the PPW 128 destined for the CE network element 110 and the PE network element 120 also includes a CE bound EIM module to decapsulate packets on the PPW 128 destined for the CE network element 110. That is, in some embodiments, the CE network element 110 and the PE network element 120 act as egress network elements and the CE network element 140 and the PE network element 130 act as ingress network elements. The encapsulation format described with reference to FIG. 1 does not account for control word processing being used on the PPW 128, however this is in order not to confuse understanding of the invention as control words are supported and the corresponding encapsulation format when control word processing is used on the PPW is more fully described later herein.

At an operation 1, the PE network element 120 receives the Ethernet frame 151 on the attachment circuit 118. The Ethernet frame 151 includes the data link layer header 152 and a packet 154, which may be an IP, MPLS, or other protocol packet. The PE bound EIM module 125 encapsulates the packet in a protocol data unit (PDU) for the PPW depending on the type of packet, however each packet includes header and other information required for traversing on the PPW 128 (e.g., PSN tunnel and PSN physical headers, and a PW label). For IP and MPLS packets, the PE bound EIM module 125 encapsulates the packet into a PPW-PDU (packet-pseudowire-protocol data unit) (sometimes referred herein as a PPW packet) without using the data link layer header 152 of the frame 151. Thus, assuming that the protocol packet type of the packet 154 is IP, at operation 2A the IP packet 154 is encapsulated in the PPW packet 160 and transmitted on the PPW 128 across the MPLS PSN 150. The PPW packet 160 includes the PSN tunnel and physical header 162, the pseudowire label 164, and the IP packet 154 and does not include substantially all of the fields or the entire the data link layer header 152. In a similar fashion, assuming that the protocol packet type of the packet 154 is MPLS, at operation 2B, the MPLS packet 154 is encapsulated in the PPW packet 165 and transmitted on the PPW 128 across the MPLS PSN 150. The PPW packet 165 includes the PSN tunnel and physical header 162, the pseudowire label 164, and the MPLS packet 154, and does not include substantially all of the fields or the entire data link layer header 152.

For non-IP/MPLS packets (e.g., control packets such as ARP, LDDP, or other protocol that is not IP or MPLS), and control word processing is not established on the PPW, the PE bound EIM module 125 encapsulates the frame 151 into a GRE packet using IP as the delivery protocol and sets the IP destination address and optionally the IP source address to be non-routable addresses to identify that the packet is a protocol packet on the PPW 128, and does not belong to a genuine GRE tunnel in the IP address space of the payload. Encapsulating frames having non-IP/MPLS packet payloads into a GRE packet using IP as a delivery protocol allows ECMP based on IP to be implemented in the MPLS PSN 150 (e.g., implemented by P network elements in the MPLS PSN 150), which reduces the requirement to implement other flow re-ordering techniques. For example, some intermediate network elements in the PSN look beyond the MPLS label stack for an IP packet during ECMP processing. Typically this is performed in a heuristic manner by looking at the first nibble past the label stack to speculate what the packet type is (and if it is IP perform ECMP processing). However, this speculation is sometimes wrong which results in incorrect ECMP processing, which can lead to traffic loss or other problems. ECMP processing may also lead to flow re-ordering. There are techniques to prevent incorrect ECMP processing including using a control word (described in RFC 4385), which will essentially avoid ECMP processing, and the use of flow labels (e.g., described in IETF draft "Flow Aware Transport of Pseudowires over an MPLS PSN", draft-ietf-pwe3-fat-pw-03, Jan. 27, 2010), that, while allowing for ECMP processing, require extra processing resources and packet overhead (e.g., identifying flows and adding flow labels to the label stack).

However, ECMP based on IP (looking for an IP packet beyond the MPLS label stack) when the payload of the PPW-PDU is IP will not reorder any flows. Thus, by encapsulating the frame 151 into a GRE packet using IP as the delivery protocol as described in some embodiments of the invention, ECMP processing can be performed in the PSN without reordering any flows and without requiring flow labels. It should be understood that flow labels can still be used in embodiments of the invention if it is desired to separate the packets into flows for reasons in addition to ensuring proper flow ordering for ECMP processing (e.g. to treat multiple packet flows as a single flow by assigning the same flow label to each of the different flows). Thus, for non-IP/MPLS packets, the encapsulation format described herein obviates the need for control words to prevent flow re-ordering and obviates the need for flow labels (thereby saving processing resources to identify the flow (through packet classification) and adding the flow labels). As will be described in greater detail later herein, if the PPW 128 is using control words, the non-IP/MPLS packet will not be encapsulated into a GRE packet.

Thus, assuming that the protocol packet type of the packet 154 is not IP or MPLS and control words are not being used, then at operation 2C the frame 151 is encapsulated in a GRE packet that is encapsulated in the PPW packet 170 and transmitted on the PPW 128 across the MPLS PSN 150. The PPW packet 170 includes the PSN tunnel and physical header 162, the pseudowire label 164, the IP header 172, the GRE header 174, and the GRE payload (Ethernet frame) 151. The IP header 172 includes at least a non-routable IP destination address in the 127/8 range and may include a non-routable IP source address in the 127/8 range. The protocol type in the GRE header 174 is set according to the protocol of the payload encapsulated in the Ethernet frame 151. The TTL (Time to Live) in the IP header 172 is set to 0 or 1 to prevent the packet from being IP routed.

The PPW packets are carried on the PPW 128 through the MPLS PSN 150, which may include one or more intermediate network elements before being received at the PE network element 130. The CE bound EIM module 135 decapsulates the PPW packets received on the PPW 128 depending on the type of packet encapsulated in the PPW packet. For IP and MPLS packets (e.g., the PPW packets 160 and 165), the CE bound EIM module 135 reconstructs the fields of the data link layer header which was omitted from those PPW packets (which may include reconstructing the entire data link layer header). The CE bound EIM module 135 uses stored data link layer header information for the reconstruction. For example, the stored data link layer header information includes the MAC addresses of the CE network elements 110 and 140 (which can be configured, signaled, or dynamically learned) and the VLAN tag stack associated with the attachment circuits. The CE bound EIM module 135 may also use a mapping function to map IP differentiated services (described in RFC 2474, December 1998) to Ethernet PCP bits (if the attachment circuits are tagged). For non-IP/MPLS packets that include the data link layer header information and are encapsulated in a GRE packet using IP as a delivery protocol, the packet is shunted off the IP/MPLS decapsulation path and the Ethernet frame is processed in a regular fashion. Thus, at operation 3, the CE bound EIM module 135 decapsulates the PPW packet and transmits the Ethernet frame 180 over the attachment circuit 138 to the CE network element 140. The Ethernet frame 180 includes the data link layer header 182 and the packet payload 154.

Figure 2:
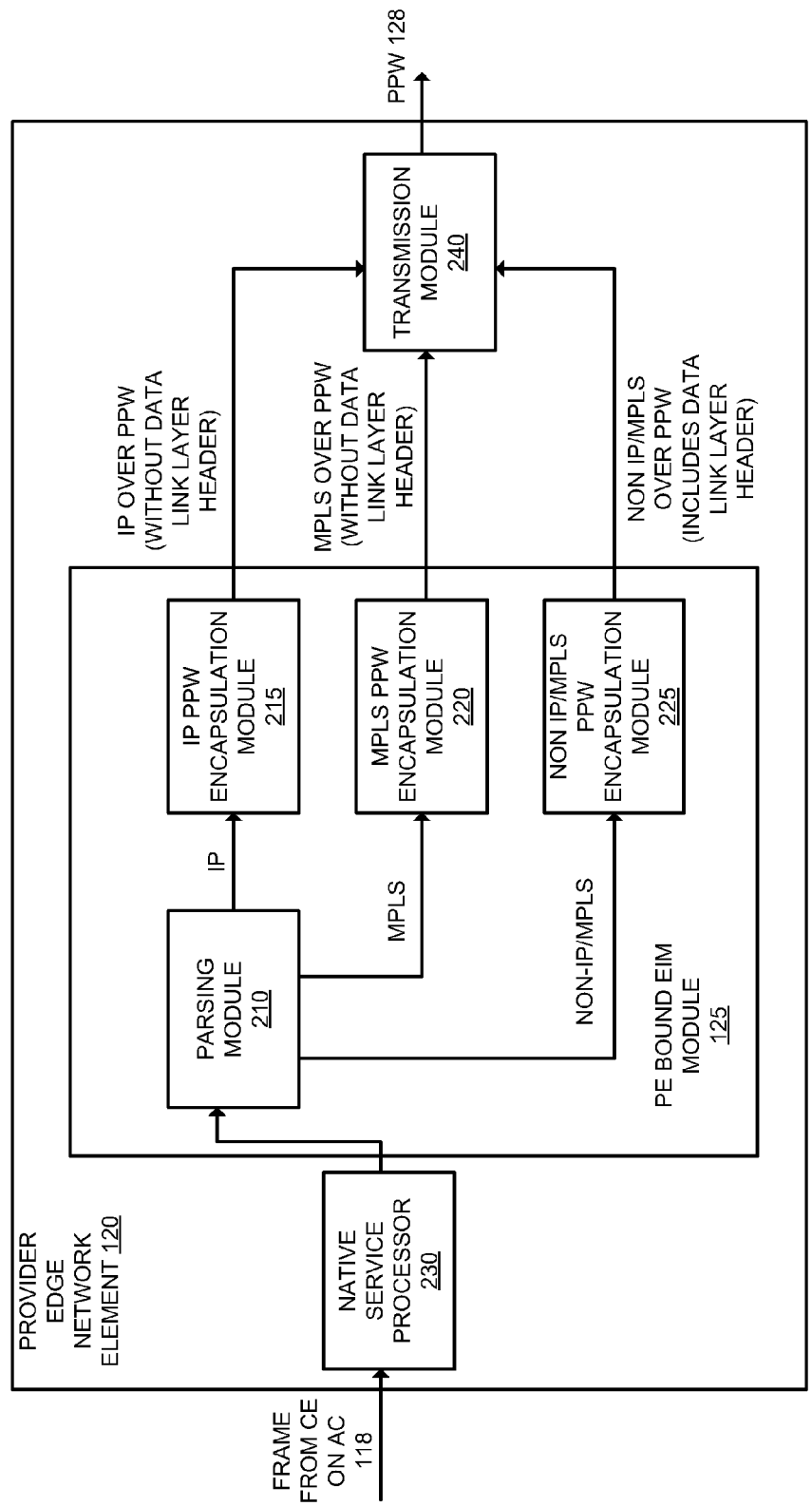
FIG. 2 is a block diagram illustrating an ingress PE network element of FIG. 1 in more detail according to one embodiment of the invention.
Figure 4:
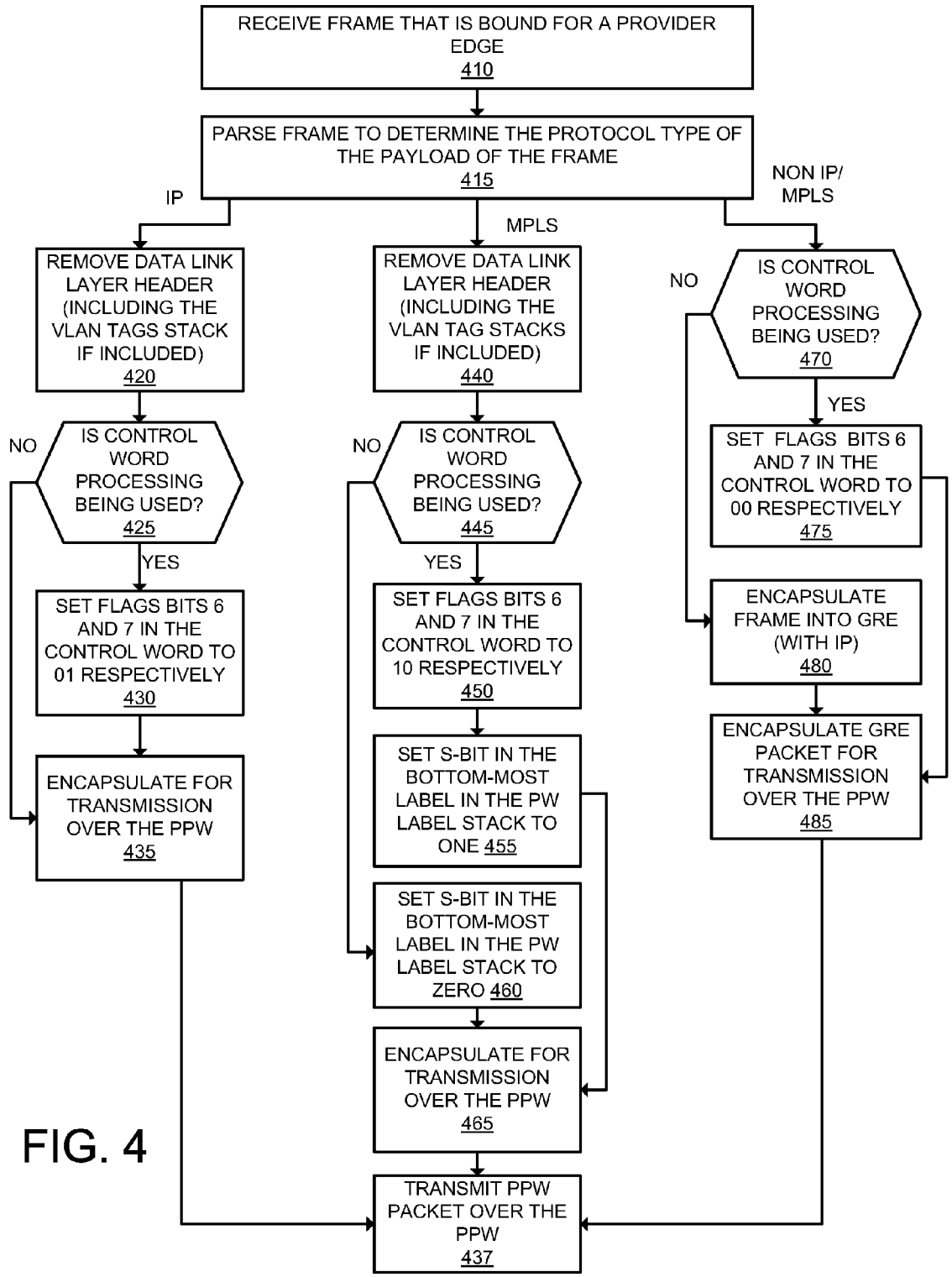
FIG. 4 is a flow diagram illustrating exemplary operations for encapsulating frames into PPW packets that are PE bound according to one embodiment of the invention.

FIG. 2 is a block diagram illustrating the PE network element 120 in more detail according to one embodiment. FIG. 2 will be described with reference to the exemplary operations of FIG. 4. However, it should be understood that the operations of FIG. 4 can be performed by embodiments other than those discussed with reference to FIG. 2, and the embodiments discussed with reference to FIG. 2 can perform operations different than those discussed with reference to FIG. 4. FIG. 4 will be described with reference to a packet flowing from the CE network element 110 (referred as the ingress CE network element) to the CE network element 140 (referred to as the egress CE network element); however it should be understood that the CE network element 140 may transmit packets destined for the CE network element 110 in some embodiments.

As illustrated in FIG. 2, the PE network element 120 includes the native service processor (NSP) 230, which is coupled with the PE bound EIM module 125. The NSP 230 performs processing specific to the attachment circuit 118. For example, assuming that the attachment circuit 118 is an Ethernet circuit, the NSP 230 may perform functions that are required for processing Ethernet frames such as VLAN translation, shaping, policing, etc.

The PE bound EIM module 125 includes the parsing module 210, the IP PPW encapsulation module 215, the MPLS PPW encapsulation module 220, and the non-IP/MPLS PPW encapsulation module 225. The parsing module 210 parses frames received on the attachment circuit 118 to determine the protocol type of the payload of the frame. If it is an IP payload, then the frame is passed to the IP PPW encapsulation module 215 for encapsulation on the PPW. If it is an MPLS payload, then the frame is passed to the MPLS PPW encapsulation module 220 for encapsulation on the PPW. If it is a non-IP/MPLS payload, then the frame is passed to the non-IP/MPLS PPW encapsulation module 225 for encapsulation on the PPW.

With reference to FIG. 4, at block 410, the PE bound EIM module 125 receives a frame that is bound for the PE network element 130. Flow then moves to block 415 where the parsing module 210 parses the frame to determine the protocol type of the payload of the frame. For example, the parsing module 210 examines the Ethernet type field of the Ethernet frame. If the payload is an IP packet (identified by a value of the Ethernet type field being 0x800 for IPv4 or 0x86DD for IPv6), then flow moves to block 420. If the payload is an MPLS packet (identified by a value of the Ethernet type field being 0x8847 or 0x8848), then flow moves to block 440. If the payload is any other protocol (not IP or MPLS), then flow moves to block 470.

At block 420 (the payload is an IP packet), the IP PPW encapsulation module 215 removes the data link layer header including the VLAN tags stack if included. It should be noted that removing the VLAN tags stack in this operation assumes that the IP addresses are unique across VLAN tags. However, if the endpoints of the VLANs use private addressing, IP uniqueness is not guaranteed. In such cases, a separate PPW may be established for each VLAN and it can be assumed that the IP addresses are unique across VLAN tags. Flow then moves to block 425, where the IP PPW encapsulation module 215 determines whether control word processing is established for the PPW 128. Control word processing provides the ability to prevent re-ordering within a packet flow by preventing ECMP treatment on the packet-pseudowire in the PSN. For example, the PPW 128 may be associated with a control word attribute that is set when the PPW 128 is negotiated. A PPW 128 that has enabled control word processing typically cannot dynamically transition between an enabled control word-PPW and a disabled control word-PPW without the PPW being deleted and recreated. If the control word is not established on the PPW 128, then flow moves to block 435 where the IP PPW encapsulation module 215 encapsulates the packet for transmission over the PPW 128 (e.g., adding the appropriate PSN tunnel header and PSN physical headers and the PW label). Flow moves from block 435 to block 437 and the transmission module 240 transmits the PPW packet on the PPW 128 towards the PE network element 130.

Figure 7:
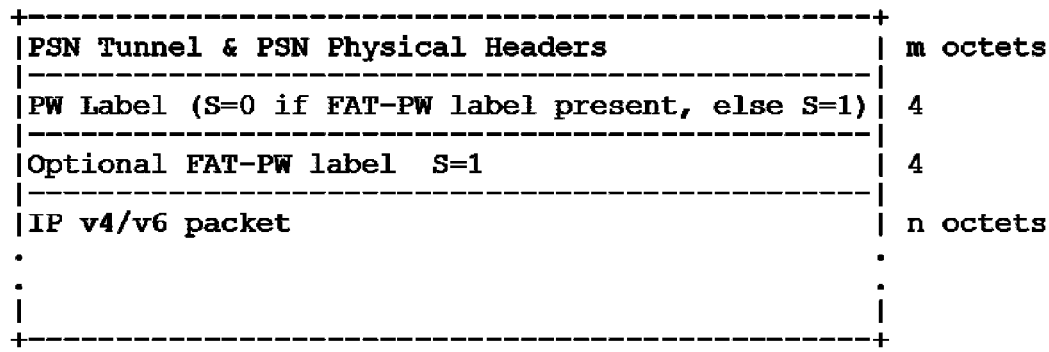
FIG. 7 illustrates an exemplary encapsulation format of an IP packet encapsulated into PPW without control word processing being used according to one embodiment of the invention.

FIG. 7 illustrates an exemplary encapsulation format of an IP packet encapsulated into PPW without control word processing being used according to one embodiment. As illustrated in FIG. 7, the encapsulation format includes the PSN tunnel and PSN physical headers, the PW label, whose S-bit in the bottom most label in the PW label stack is set to 1 if there is not a FAT (Flow Aware Transport) PW label present (otherwise it is set to zero), the optional FAT-PW label whose S-bit is set to one, and the IP packet. It should be understood that the exemplary format of FIG. 7 does not include the data link layer header of the frame, however in other formats at least some portion of the data link layer header may be included.

Figure 8:
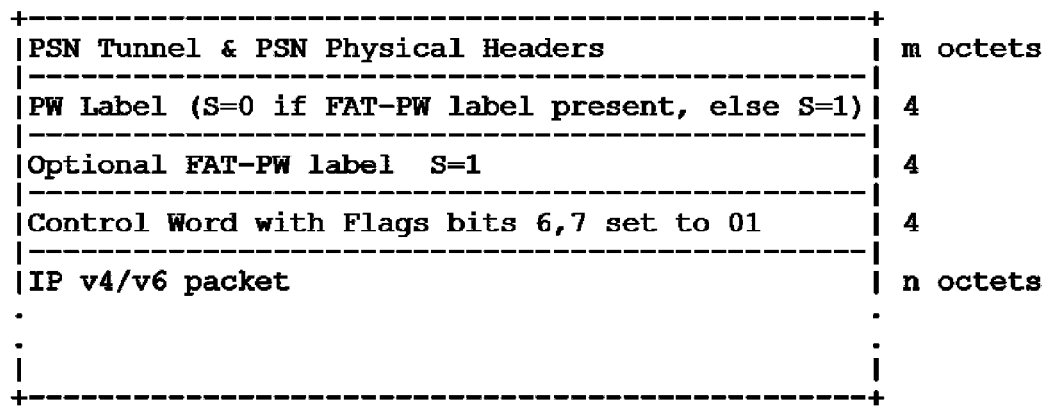
FIG. 8 illustrates an exemplary encapsulation format of an IP packet encapsulated into PPW with control word processing being used according to one embodiment of the invention.

Referring back to FIG. 4, if control word processing is being used on the PPW, flow moves from block 425 to block 430, where the IP PPW encapsulation module 215 sets the flags bits 6 and 7 in the control word to indicate that it is an IP packet encapsulated in the PPW packet. In one embodiment, the flags bits 6 and 7 are set to 0 and 1 respectively. FIG. 8 illustrates an exemplary encapsulation format of an IP packet encapsulated for transmission on the PPW that uses control words according to one embodiment. The encapsulation format illustrated in FIG. 8 is similar to the encapsulation format of FIG. 7 with the addition of the control word with flags bits 6 and 7 set to 0 and 1.

Figure 9:
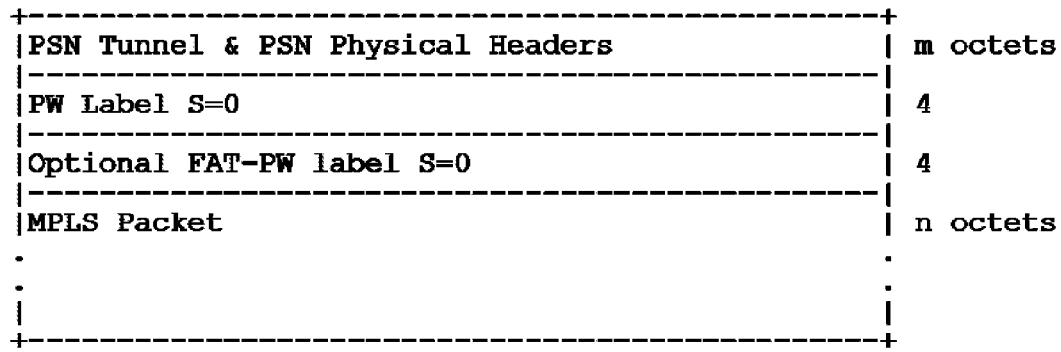
FIG. 9 illustrates an exemplary encapsulation format of an MPLS packet encapsulated into PPW without control word processing being used according to one embodiment of the invention.

Referring back to FIG. 4, at block 440 (the payload is an MPLS packet), the MPLS PPW encapsulation module 220 removes the data link layer header including the VLAN tags stack if included. Flow then moves to block 445 and the MPLS PPW encapsulation module 220 determines whether control word processing is established for the PPW. If control word processing is not being used, then flow moves to block 460 and the MPLS PPW encapsulation module 220 sets the S-bit (bottom of stack bit) in the bottom most label in the PW label stack to zero. Flow moves from block 460 to block 465 and the MPLS payload packet is encapsulated for transmission over the PPW. FIG. 9 illustrates an exemplary encapsulation format of an MPLS packet encapsulated into PPW without control words being used according to one embodiment. As illustrated in FIG. 9, the encapsulation format includes the PSN tunnel and PSN physical headers, the PW label, whose S-bit is set to 0, the optional FAT-PW label whose S-bit is set to 0, and the MPLS packet. It should be understood that the exemplary format of FIG. 9 does not include the data link layer header of the frame, however in other formats at least some portion of the data link layer header may be included. Flow moves from block 465 to block 437 and the transmission module 240 transmits the PPW packet on the PPW 128 towards the PE network element 130.

Figure 10:
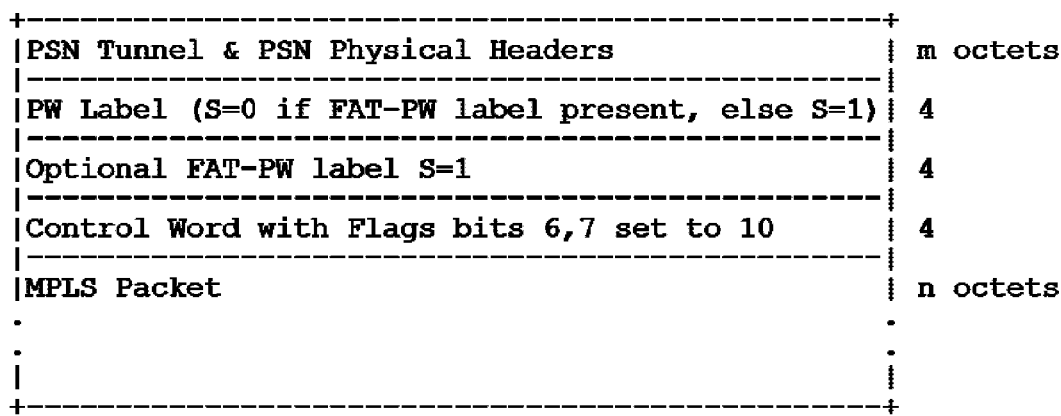
FIG. 10 illustrates an exemplary encapsulation format of an MPLS packet encapsulated into PPW with control word processing being used according to one embodiment of the invention.

With reference back to FIG. 4, if control word processing is established on the PPW, control flows from block 445 to block 450 and the MPLS PPW encapsulation module 220 sets the flags bits 6 and 7 in the control word to indicate that the PPW packet has an MPLS payload. In one embodiment, the flags bits 6 and 7 are set to 1 and 0 respectively. Flow moves from block 450 to block 455 and the MPLS PPW encapsulation module 220 sets the S-bit in the bottom most label in the PW label stack to 1. Flow then moves to block 465. FIG. 10 illustrates an exemplary encapsulation format of an MPLS packet encapsulated into PPW with control words being used according to one embodiment. The encapsulation format illustrated in FIG. 10 is similar to the encapsulation format of FIG. 9 with the addition of the control word with flags bits 6 and 7 set to 10 and the S-bit in the bottom most layer in the PW label stack is set to 1 (instead of 0, assuming that an optional FAT-PW label is not being used).

If the payload is not an IP or MPLS packet (a non-IP/MPLS payload), then flow moves to block 470. At block 470, the non-IP/MPLS PPW encapsulation module 225 determines whether control word processing is established on the PPW. If control word processing is not being used, then the Ethernet frame is encapsulated into a GRE packet using IP as a delivery protocol. The GRE header protocol type is set according to the protocol of the payload encapsulated in the Ethernet frame. The IP destination address and optionally the IP source address are set to non-routable addresses in the 127/8 range. In some embodiments, the same addresses are used for the life of the PPW 128. The IP header TTL value is set to 0 or 1. The checksum value in the GRE header and in the IP header can be set to 0 since the packet is not forwarded based on these headers and the protocol packet typically has its own data integrity verification mechanisms. In one embodiment, if the IP packet (encapsulating GRE) exceeds the PPW's MTU (maximum transmission unit), IP fragmentation is used (e.g., as described in RFC 4623, "Pseudowire Emulation Edge-to-Edge (PWE3) Fragmentation and Reassembly", August 2006) provided that the PE network element 130 is capable of IP reassembly (if the PE network element 130 is not capable of IP reassembly, the packet will be dropped). Flow moves from block 480 to block 485 and the GRE packet is encapsulated for transmission over the PPW 128. Flow moves from block 485 to block 437 and the transmission module 240 transmits the PPW packet on the PPW 128 towards the PE network element 130.

FIG. 11 illustrates an exemplary encapsulation format of a non-IP/MPLS packet encapsulated into PPW without control words being used according to one embodiment. As illustrated in FIG. 11, the encapsulation format includes the following: the PSN tunnel and PSN physical headers; the PW label, whose S-bit is set to 0 if the optional FAT-PW label is present or is otherwise set to 1; the optional FAT-PW label whose S-bit is set to 1; the IP header (GRE delivery header) where the IP protocol field is set to indicate GRE, TTL value is set to 1, and the IP destination address is set to a number in the 127/8 range; the GRE header; and the GRE payload packet (the Ethernet frame). It should be understood that the exemplary encapsulation format of FIG. 11 includes the entire Ethernet frame (in the GRE payload), which includes the data link layer header.

If a control word is being used for non-IP/MPLS PPW encapsulation, then the flow moves from block 470 to block 475 and the non-IP/MPLS PPW encapsulation module 225 sets the flags bits 6 and 7 in the control word to indicate that the PPW packet has a non-IP/MPLS payload. In one embodiment, the flags bits 6 and 7 are set to 0 and 0 respectively. Flow moves from block 475 to block 485. FIG. 12 illustrates an exemplary encapsulation format of a non-IP/MPLS packet encapsulated into PPW with control words being used according to one embodiment. As illustrated in FIG. 12, the encapsulation format includes the following: the PSN tunnel and PSN physical headers; the PW label, whose S-bit is set to 0 if the optional FAT-PW label is present or is otherwise set to 1; the optional FAT-PW label whose S-bit is set to 1; the control word with the flag bits 6 and 7 set to 0 and 0 respectively, and the Ethernet frame. In one embodiment, if the control word is present, the Ethernet frame immediately follows the control word. In one embodiment, if the PPW packet exceeds the MTU of the PPW, then IP fragmentation (e.g., as described in RFC 4623) is used provided that the PE network element 130 is capable of IP reassembly (if it is not capably of IP reassembly, the packet will be dropped). It should be understood that the exemplary encapsulation format of FIG. 12 includes the entire Ethernet frame.

Thus, in one embodiment, the encapsulation format described herein improves efficiency for transporting IP and MPLS packets on the PPW by excluding the data link layer header on the PPW for these packets. This reduces the number of overhead bytes on the PPW, which leads to a significant reduction in bandwidth (as a percentage of packet size) as a result in smaller fragments. In addition, since fragmentation occurs when the size of a PPW packet exceeds the MTU of the PPW, exclusion of the data link layer header on the PPW for IP and MPLS packets also reduces the possibility of fragmentation (and the required reassembly) for large IP and MPLS packets. The encapsulation format also supports control words and/or flow labels (FAT-PW) if desired.

In addition, the encapsulation format described herein allows for non-IP and non-MPLS packets to be encapsulated on the PPW. In the case of non-IP/MPLS packets where control word processing is not being used and a GRE encapsulation using IP as the delivery header, this encapsulation format allows intermediate nodes in the PSN to perform ECMP based on IP which reduces the requirement to implement control words or other flow re-ordering techniques. However, the encapsulation format is flexible in that it also supports control words and/or flow labels if they are desired.

Thus, the encapsulation format described herein (without control word processing) is not susceptible to re-ordering flows within the PPW. This also takes advantages of ECMP implementations that examine the first nibble after the MPLS label stack to determine whether the labeled packet is an IP packet. Such implementations, which are widely available, will correctly identify the IP flow in the PPW. The flows of non-IP/MPLS protocols carried on the PPW will not be re-ordered if the same source and destination IP addresses are used in the GRE delivery header for the life of the PPW. Thus, a control word is not necessary to prevent flow re-ordering. The encapsulation format can also obviate the need for flow labels within the PPW, which saves processing resources at the ingress to identify the flow (through packet classification) and to add the flow-label. When an ECMP based on the label stack is required (as compared to ECMP based on IP), then the flow label (FAT labels) can be used with the encapsulation format described herein. It should be understood that excluding a control word and/or a flow label from a PPW packet reduces the packet size by up to 8 bytes.

Figure 3:
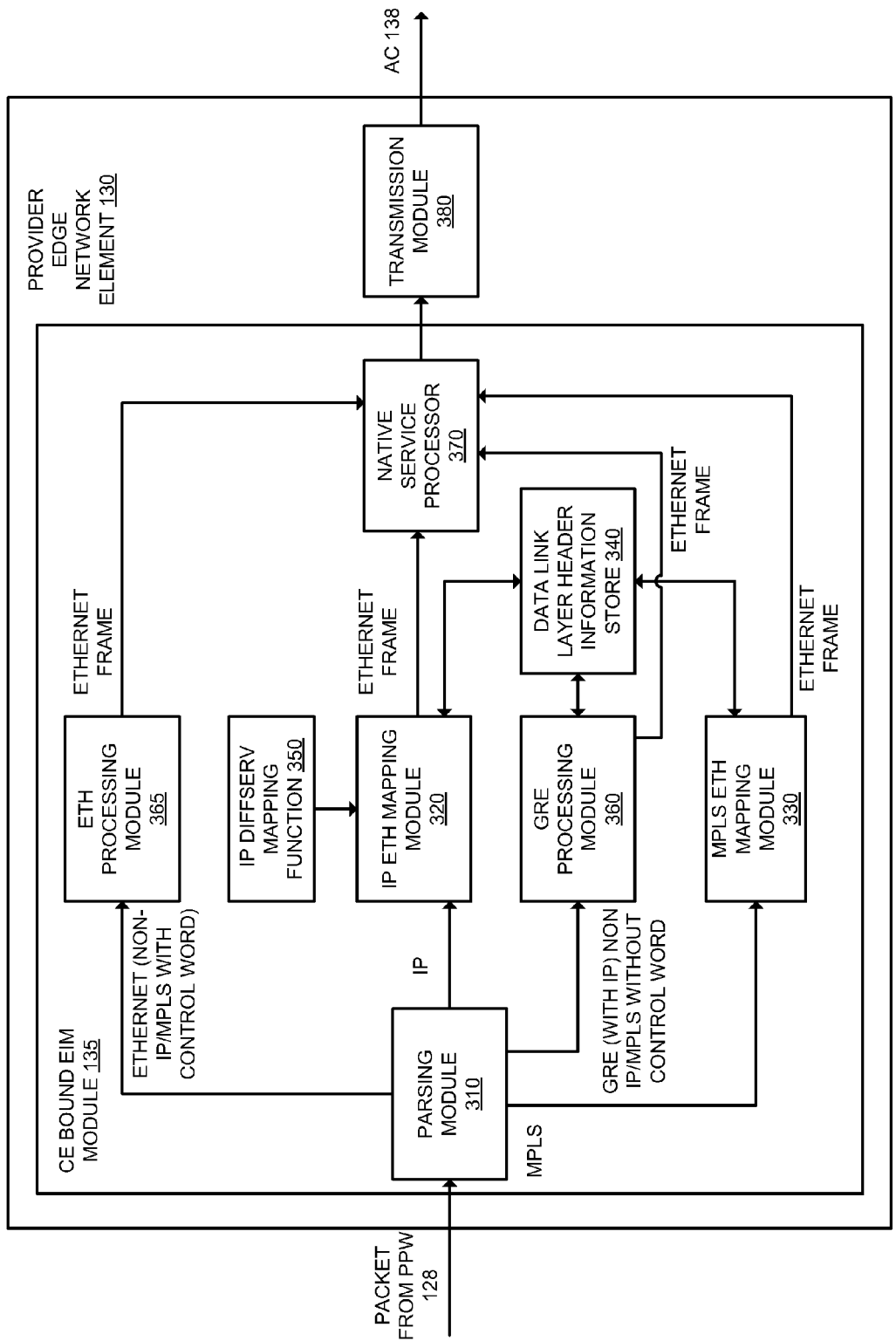
FIG. 3 is a block diagram illustrating an egress PE network element of FIG. 1 in more detail according to one embodiment of the invention.

FIG. 3 is a block diagram illustrating the PE network element 130 in more detail according to one embodiment. FIG. 3 will be described with reference to the exemplary operations of FIGS. 5A-B and 6. However, it should be understood that the operations of FIGS. 5A-B and 6 can be performed by embodiments other than those discussed with reference to FIG. 3, and the embodiments discussed with reference to FIG. 3 can perform operations different than those discussed with reference to FIGS. 5A-B and 6.

As illustrated in FIG. 3, the PE network element 130 includes the parsing module 310, the IP Ethernet mapping module 320, the MPLS Ethernet mapping module 330, the data link header information store 340, the IP DiffServ mapping function 350, the GRE processing module 360, the Ethernet processing module 365, the native service processor 370, and the transmission module 380. The parsing module 310 parses PPW packets received on the PPW 128 to determine the type and location of the payload in the PPW packet. If the payload is an IP packet that is not GRE encapsulated, then the packet is passed to the IP Ethernet mapping module 320 for decapsulating and reconstructing the omitted fields of the data link layer header. If the payload is an MPLS packet, then the packet is passed to the MPLS Ethernet mapping module 330 for decapsulating and reconstructing the omitted field of the data link layer header. If the payload is a GRE packet, then the packet is passed to the GRE processing module for decapsulating. If the payload is an Ethernet frame, then the packet is passed to the Ethernet processing module for decapsulating. The transmission module transmits the frames to the CE network element 140 over the attachment circuit 138.

Figure 5A:
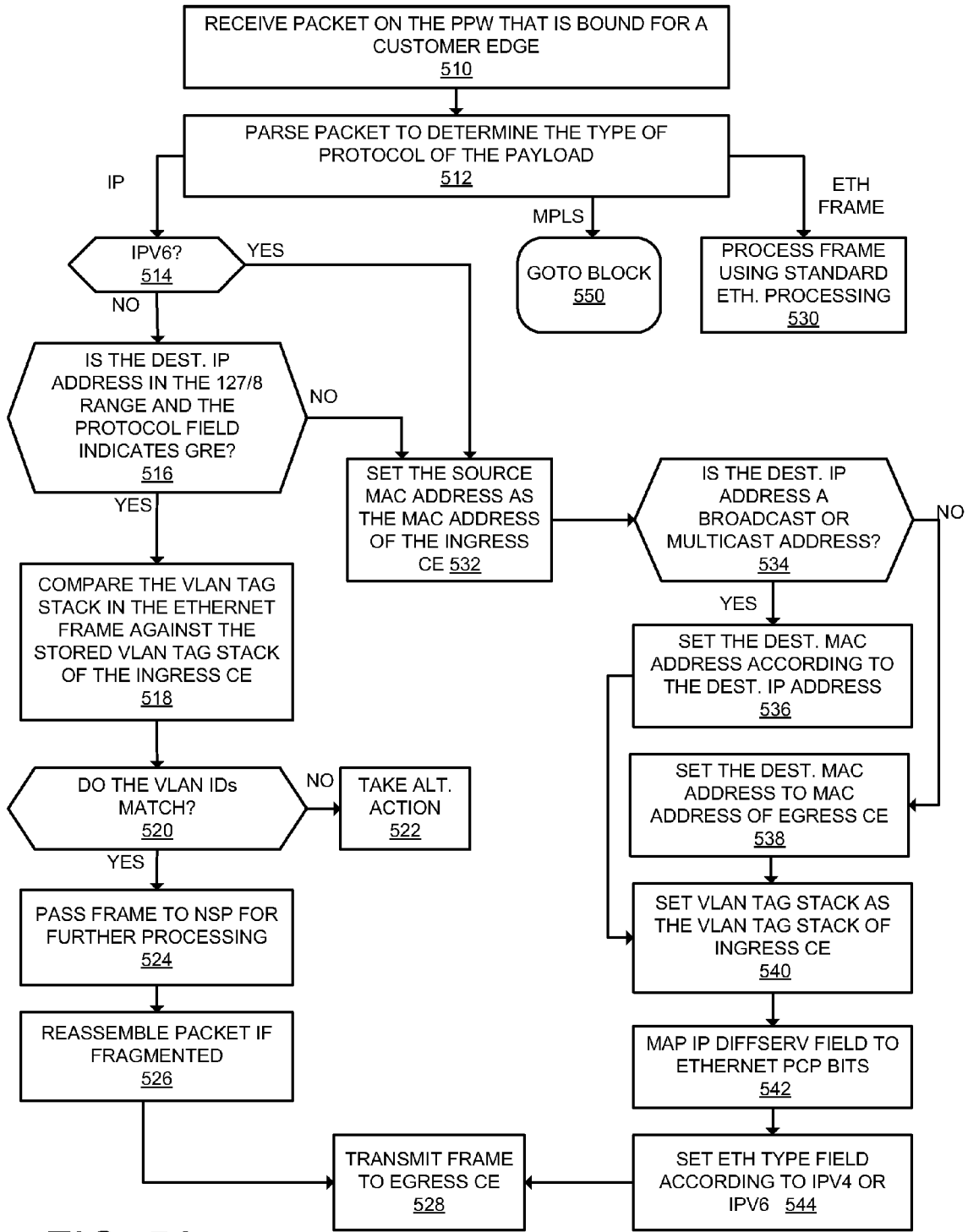
FIGS. 5A-B are flow diagrams illustrating exemplary operations for decapsulating PPW packets and creating CE bound Ethernet frames according to one embodiment of the invention.
Figure 6:
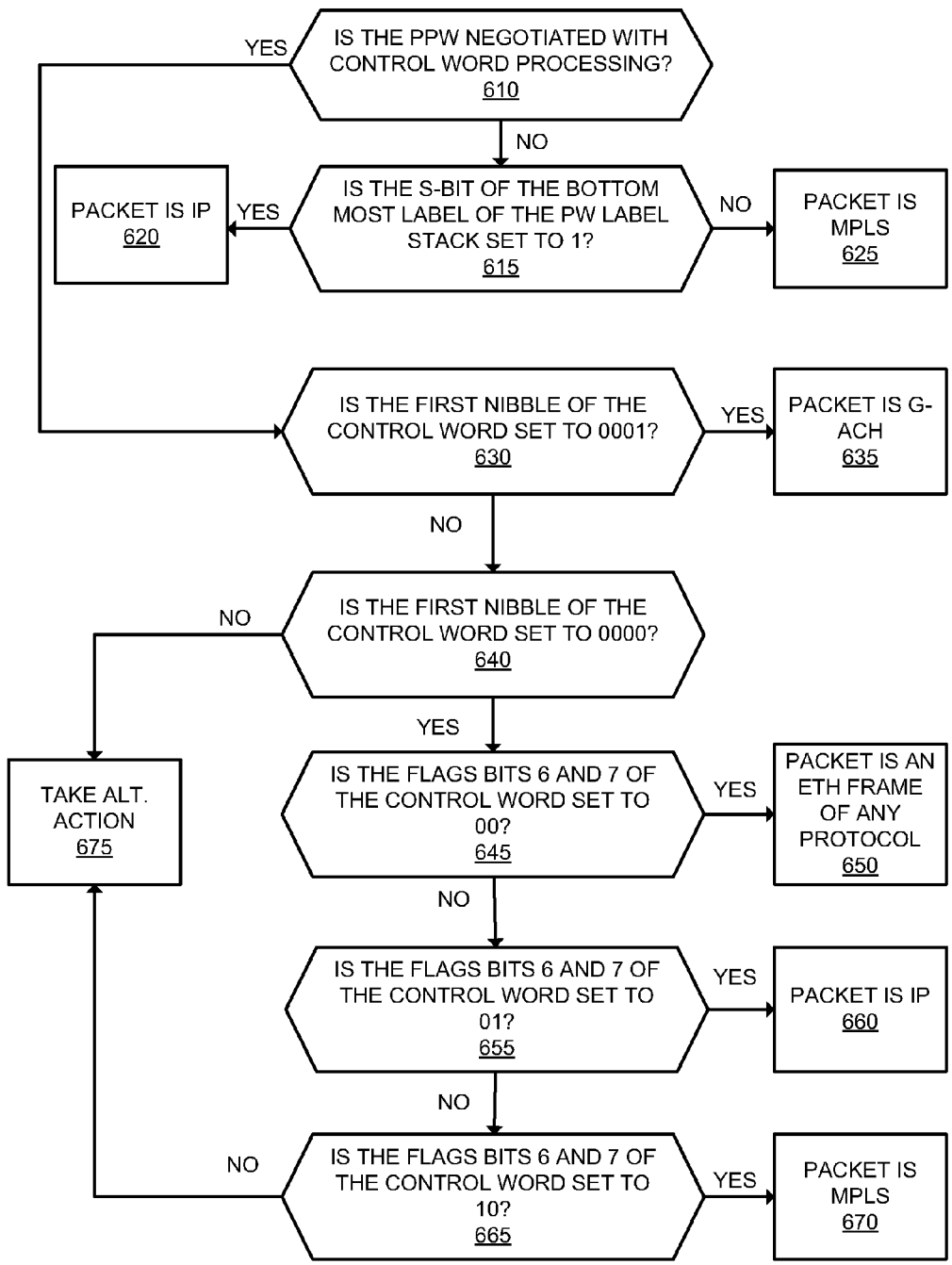
FIG. 6 is a flow diagram illustrating exemplary operations for determining the protocol type and location of the payload of a PPW packet according to one embodiment of the invention.

With reference to FIG. 5A, at block 510, the CE bound EIM module 135 receives a PPW packet from the PPW 128 that is CE network element 140 bound. Flow then moves to block 512 where the parsing module 310 parses the packet to determine the type of protocol of the payload and the location of the payload. FIG. 6 is a flow diagram illustrating exemplary operations for determining the protocol type and location of the payload of a PPW packet according to one embodiment of the invention. At block 610, the parsing module 310 determine whether the PPW 128 is negotiated with control word processing. For example, when the PPW 128 is negotiated between the PE network elements 120 and 130, the PPW 128 will be associated with an attribute indicating whether control word processing has been established for the PPW 128. If it is not negotiated with control word processing, then flow moves to block 615 where the parsing module determines whether the S-bit of the bottom most label of the PW label stack is set to 1. If is the S-bit is set to 1, then flow moves to block 620 and the packet is IP and the start of the IP packet immediately follows the bottom most label in the PW label stack (which may be the PW label or a flow label if used). If it is not, then flow moves to block 625 and the packet is MPLS and the start of the MPLS packet immediately follows the bottom most label in the PW label stack (which may be the PW label or a flow label if used).

If the PPW 128 is negotiated with control word processing, then flow moves from block 610 to block 630. The location of the control word is the location in the packet that immediately follows the bottom most label in the PW label stack. The parsing module 310 determines whether the first nibble of the control word is set to 0001. If it is, then flow moves to block 635 and the packet is G-ACh (an MPLS Generic Associated Channel packet) and the location of the packet begins immediately following the control word (4 bytes after the bottom most label in the PW label stack). If the packet is a G-Ach packet then its processing follows the procedure described in RFC 5085, "Pseudowire Virtual Circuit Connectivity Verification (VCCV): A Control Channel for Pseudowires", December 2007. If the first nibble of the control word is not set to 1, then flow moves to block 640. At block 640, the parsing module 310 determines whether the first nibble of the control word is set to 0000. If it is not set to 0000, then flow moves to block 675 where alternative action is taken (e.g., the packet is dropped as an invalid packet). If the first nibble of the control word is set to 0000, then flow moves to block 645 and the parsing module 310 determines whether the flags bits 6 and 7 of the control word are set to 0 and 0 respectively. If they are, then flow moves to block 650 and the packet is an Ethernet frame having a payload that is of a protocol that is not IP or MPLS, and the start of the packet is 4 bytes after the bottom most label in the PW label stack. If the flags bits 6 and 7 are not set to 0 and 0, then flow moves to block 655 and the parsing module 310 determines whether the flags bits 6 and 7 are set to 0 and 1 respectively. If they are, then flow moves to block 660 and the packet is IP and the start of the IP packet is 4 bytes after the bottom most label in the PW label stack. If the flags bits 6 and 7 are not set to 0 and 1 respectively, flow moves to block 665 and the parsing module 310 determines whether the flags bits 6 and 7 are set to 1 and 0 respectively. If they are, flow moves to block 670 and the packet is MPLS and the start of the MPLS packet is 4 bytes after the bottom most label in the PW label stack. If the flags bits 6 and 7 are not set to 1 and 0 respectively, then flow moves to block 675 where alternative action is taken (e.g., the packet is dropped).

Referring back to FIG. 5A, if the packet is an IP packet, then flow moves to block 513. If the packet is an MPLS packet, then flow moves to block 550, which will be described with reference to FIG. 5B. If the packet is a non-IP/MPLS packet encapsulated in an Ethernet frame, then flow moves to block 530 where the frame is processed using standard Ethernet processing by the Ethernet processing module 365 (e.g., examining Ethernet header information such as the source MAC address, destination MAC address, VLAN headers, etc.). At block 514, the parsing module 310 determines whether the IP packet is IPv4 or IPv6. For example, if the first nibble is 0x6 then the payload of the PPW is an IPv6 packet and flow moves to block 532. If the first nibble is 0x4, then the payload is an IPv4 packet and flow moves to block 516.

At block 516, the parsing module 310 determines whether the IP packet is a header for a GRE packet. For example, the parsing module 310 determines whether the destination IP address is in the 127/8 range and the protocol field indicates GRE (e.g., a value of 47). If it is, then it is a GRE payload packet having a non-IP/MPLS packet on the PPW, and flow moves to block 518 and the packet is processed by the GRE processing module 360. If the destination address is not in the 127/8 range or the protocol field does not indicate GRE, then it is a regular IPv4 packet and flow moves to block 532 and is processed by the IP Ethernet mapping module 320. By comparing three fields that start at fixed offsets in the header and a comparison of a fixed number of bits from those offsets will shunt the packet off the IP/MPLS decapsulation path (i.e., move the packet off the fast path of IP/MPLS processing). For example, the three fields include the first nibble (starting offset 0, field size 1 nibble), IP header protocol field (starting offset 10, field size 2), and IP destination address (starting offset 16, first byte). In addition, further validation of the GRE delivery header for the checksum, TTL, as well as GRE header validation can be performed after the packet is shunted off the IP/MPLS decapsulation path. Flow moves from block 516 to block 518.

At block 518, the GRE processing module 360 compares the VLAN tag stack in the Ethernet frame against a stored VLAN tag stack of the ingress CE. Flow then moves to block 520, and if the VLAN IDs match, then flow moves to block 524 and the frame is passed to the native service processor 370. The native service processor 370 performs processing specific to the attachment circuit 138. For example, assuming that the attachment circuit 138 is an Ethernet circuit, the NSP 370 may perform functions that are required for processing Ethernet frames such as VLAN tag swapping, priority bit re-mapping, etc. If the VLAN IDs do not match, then flow moves to block 522 where alternative action is taken (e.g., the packet is dropped). Flow moves from block 524 to block 526 and the GRE processing module 360 reassembles the packet if it was fragmented, assuming that reassembly is supported. If it is not supported, then the packet will be dropped. If the IP packet was fragmented, then it will be reassembled by the GRE processing module 360 if supported, otherwise the packet will be dropped. Flow moves from block 526 to block 528 and the transmission module 380 transmits the frame to the egress CE network element 140 on the attachment circuit 138.

Returning back to block 532 (the packet is either an IPv6 packet or an IPv4 packet that is not encapsulating GRE), the IP Ethernet mapping module 320 begins the process of reconstructing the fields of the data link layer header that were removed when encapsulating the packet on the PPW.

The IP Ethernet mapping module 320 uses data link layer header information stored in the data link layer header information 340 to reconstruct the fields of the data link layer header. The data link layer header information store 340 includes the following information: the MAC address the CE network element 110 that is associated with the AC 118, the MAC address of the CE network element 140 that is associated with the AC 138, the VLAN tag stack associated with the AC 118 (if the AC 118 is tagged), and the VLAN tag stack associated with the AC 138 (if the AC 138 is tagged). The MAC addresses of the CE network elements can be dynamically learned, configured, or signaled (or any combination thereof).

In one embodiment, since the PPW 128 is point-to-point, there is only a single MAC address at each end, and each may be separately dynamically learned. A PE network element can learn the MAC address of a locally connected CE network element (e.g., the PE network element can learn the MAC address of the CE network element 110) through the source MAC address of a received PE bound frame. For example, with reference to FIG. 1, the PE network element 120 can learn the MAC address of the CE network element 110 through the source MAC address included in the data link layer header 152 of the Ethernet frame 151. In some embodiments, only specific types of packets are used for this learning process (e.g., one or more protocols that discover the next hop MAC/L3 address (e.g., ARP, LLDP, RIP, OSPF, etc.)). In other embodiments, the MAC address of a locally connected CE network element can be learned from any packet that arrives after a certain period (e.g., the first frame that arrives after 10 minutes). A PE network element can learn the MAC address of a remotely connected CE network (e.g., the PE network element 130 can learn the MAC address of the CE network element 110) from data packets when there is a non-IP/MPLS packet (e.g., LDP) used on the PPW through the source MAC address of the non-IP/MPLS PPW CE bound packet received on the PPW. For example, with reference to FIG. 1, the PE network element 130 can learn the MAC address of the CE network element 110 through the source MAC address of a non-IP/MPLS packet received on the PPW 128.

In some embodiments, the PE network elements signal the MAC addresses of the CE network elements. In one embodiment, an LDP (Label Distribution Protocol) TLV (type, length, value) extension is used to signal the MAC address of a locally connected CE network element to the peer PE network element (referred herein as the "locally connected MAC address TLV"). The MAC address of the locally connected CE network element can either by dynamically learned or configured. For example, the PE network element 120 can use the LDP TLV extension to signal the MAC address of the CE network element 110 to the PE network element 130, and the PE network element 130 can use the LDP TLV extension to signal the MAC address of the CE network element 140 to the PE network element 120. In one embodiment, the locally connected MAC address TLV is used in the LDP notification message. FIG. 13 illustrates an exemplary locally connected MAC address TLV according to one embodiment. As illustrated in FIG. 13, the TLV includes a U (unknown) bit, an F (forward) bit, a type indicated the message is a locally connected MAC address (the value of which is to be determined), the length, and the value (the locally connected MAC address). The U bit is set to 1 unless the MAC address format is not understood (which will then be ignored by the receiving PE network element). The F bit is set to 1.

Returning back to FIG. 5A, at block 532 the IP Ethernet mapping module 320 sets the source MAC address as the MAC address of the ingress CE network element 110. For example, the IP Ethernet mapping module 320 accesses the data link layer header information store 340 to determine the MAC address of the ingress CE network element 110 (e.g., based on an ID associated with the PPW). Flow then moves to block 534, and the IP Ethernet mapping module 320 determines whether the destination IP address is a broadcast or a multicast address. If it is, then flow moves to block 536 and the IP Ethernet mapping module 320 sets the destination MAC address to a broadcast or multicast MAC address accordingly and flow moves to block 540. If the destination IP address is not a broadcast or multicast address, then flow moves from block 534 to block 538 and the IP Ethernet mapping module sets the destination MAC address to the egress CE network element 140. Flow moves from block 538 to block 540.

At block 540, the IP Ethernet mapping module 320 sets the VLAN tag stack as the VLAN tag stack of the ingress CE network element 110 (if the attachment circuit 118 is tagged, which is typically indicated by an attribute configured on the attachment circuit 118). Flow then moves to block 542 and the IP DiffServ mapping function 350 maps the IP differentiated services field to Ethernet PCP (Priority Code Point) bits for each tag in the stack (if the attachment circuit 118 is tagged). In one embodiment, if there are multiple tags in the VLAN tag stack, a separate mapping is performed for each tag. The mapping may be the same for each tag or may be different. The mapping may also be configurable. Flow moves from block 542 to block 544 and the IP Ethernet mapping module 320 sets the Ethernet type field of the packet. If the packet is IPv4, the Ethernet type field is set to 0x800 and if the packet is IPv6, the Ethernet type field is set to 0x86DD. Flow moves from block 544 to block 528 and the transmission module 380 transmits the frame to the egress CE network element 140 on the attachment circuit 138.

Figure 5B:
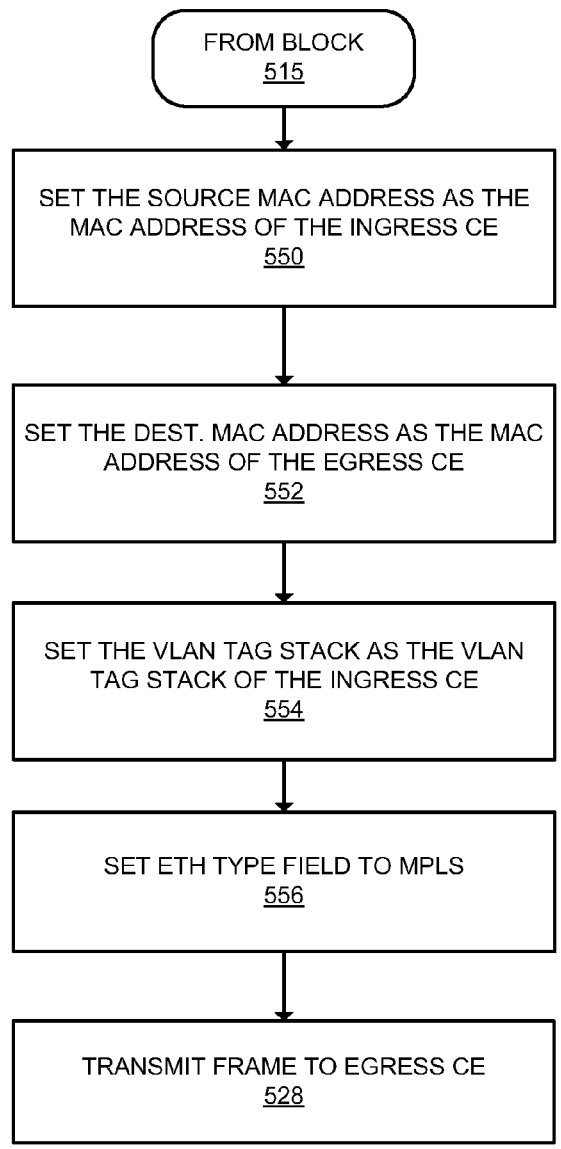

If the payload of the PPW packet is MPLS, then flow moves from block 512 to block 550 of FIG. 5B and the PPW packet is processed by the MPLS Ethernet mapping module 330. At block 550, the MPLS Ethernet mapping module 330 sets the source MAC address as the MAC address of the ingress CE network element 110. Flow then moves to block 552 and the MPLS Ethernet mapping module 330 sets the destination MAC address as the MAC address of the egress CE network element 140. Next, flow moves to block 554 and the MPLS Ethernet mapping module 330 sets the VLAN tag stack as the VLAN tag stack of the ingress CE network element 110 (if the attachment circuit 118 is tagged). Flow then moves to block 556 and the MPLS Ethernet mapping module 556 sets the Ethernet type field to indicate that an MPLS payload is encapsulated in the frame (e.g., the Ethernet type field is set to 0x8847). Flow then moves to block 528 and the transmission module 380 transmits the frame to the egress CE network element 140 on the attachment circuit 138.

Thus, the egress PE network element (the PE network element receiving CE bound PPW packets on the PPW) reconstructs the omitted fields of the data link layer headers when creating CE bound Ethernet frames for IP (non-GRE encapsulated) and MPLS packets that were encapsulated on the PPW and omitted fields of the data link layer header. Thus, the PE network elements receiving CE bound PPW packets (egress PE network elements) support an efficient encapsulation format for IP and MPLS packets by reducing the amount of overhead carried on the PPW. This also reduces the possibility of fragmented packets and the required assembly at the egress PE network element, which increases throughput of the PSN.

Figure 14:
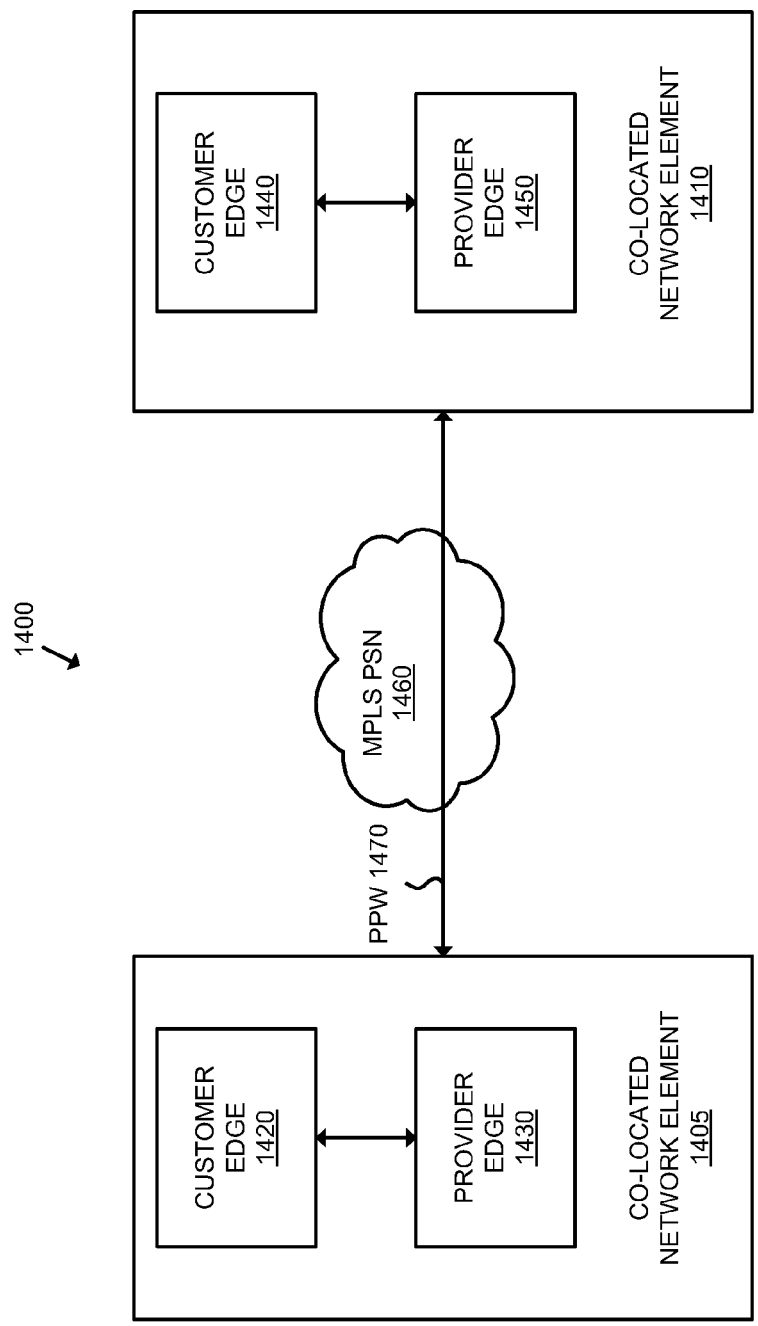
FIG. 14 illustrates an exemplary network that implements an efficient IP and MPLS encapsulation format for a PPW while allowing for other protocol types on the PPW where a CE and corresponding PE are co-located on the same physical network element, according to one embodiment of the invention.

While embodiments have been described with reference to the exemplary network model illustrated in FIG. 1, other types of networks may use embodiments of the invention described herein. FIG. 14 illustrates an exemplary network 1400 that implements an efficient IP and MPLS encapsulation format for a PPW while allowing for other protocol types on the PPW. The network 1400 differs from the network 100 of FIG. 1 in that the CE and PE are co-located within the same physical network element. Thus, the co-located network element 1405 includes the CE 1420 and the PE 1430. The co-located network element 1410 includes the CE 1440 and the PE 1450. The PE 1430 and 1450 are coupled together over the PPW 1470 that is carried over the MPLS PSN 1460. The PE network elements 120 and 130 are coupled together over the PPW 128 being carried over the MPLS PSN (Packet Switched Network) 150. The PPW 128 is a point-to-point (p2p) link. Although not illustrated in FIG. 1, the PPW 128 is carried over a PSN tunnel through the MPLS PSN 150. In addition, the MPLS PSN 150 includes one or more intermediate network elements (sometimes referred to as provider (P) network elements).

Figure 15:
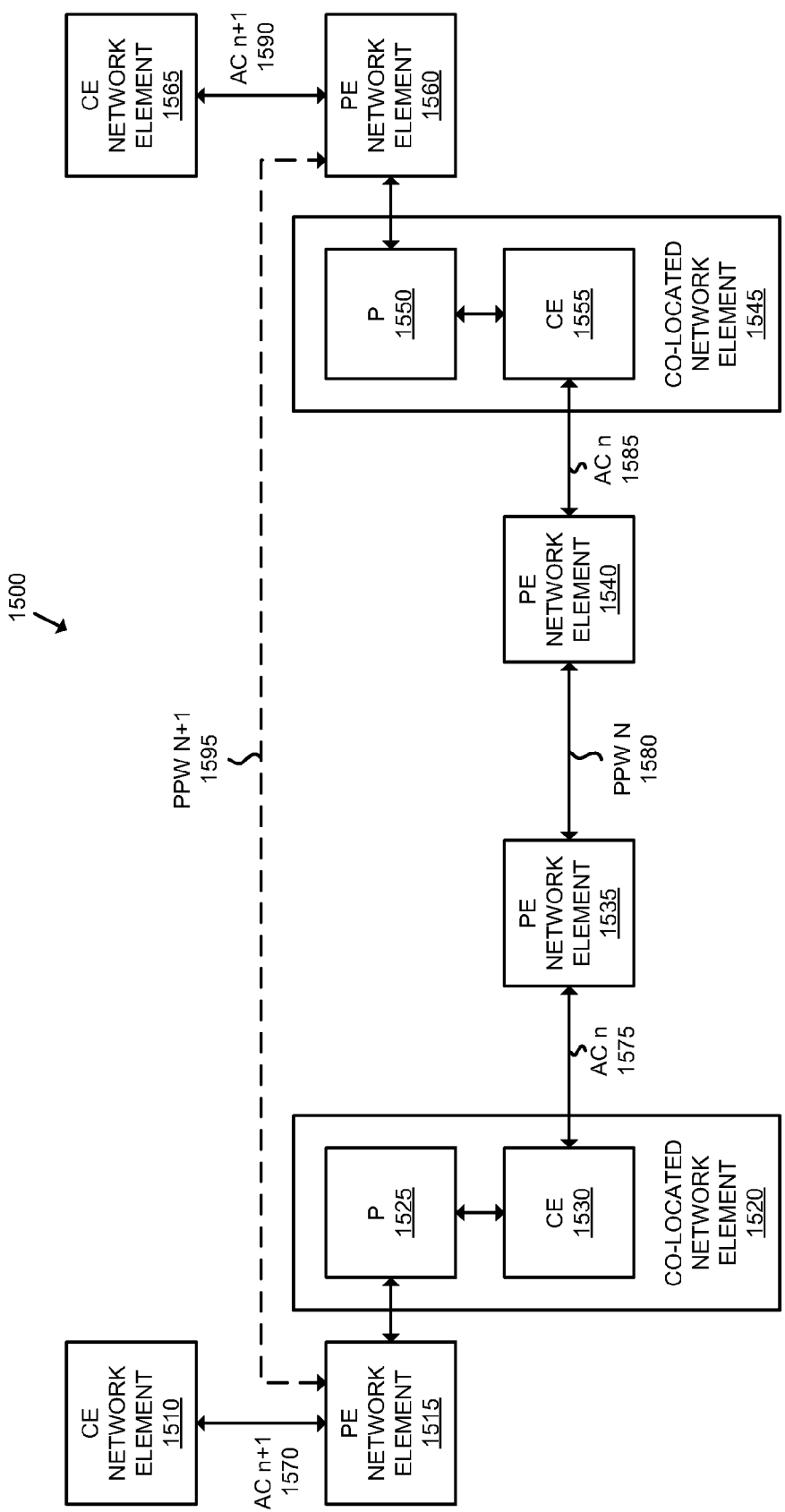
FIG. 15 illustrates a multi-layer network that implements an efficient IP and MPLS encapsulation format on a PPW while allowing for other protocol types on the PPW, according to one embodiment of the invention.

FIG. 15 illustrates a multi-layer network 1500 that implements an efficient IP and MPLS encapsulation format on a PPW while allowing for other protocol types on the PPW. In multi-layer networks, as the number of layers increases the amount of overhead typically required to stack each layer correspondingly increases. The PPW N+1 1595 emulates a service between the CE network elements 1510 and 1565. The CE network element 1510 is coupled with the PE network element 1515 over the AC N+1 1570. The CE network element 1565 is coupled with the PE network element 1560 over the AC N+1 1590. The PE network elements 1520 and 1560 are coupled with the co-located network elements 1520 and 1545 respectively. The co-located network element 1520 includes the P network element 1525 and the CE network element 1530. The co-located network element 1545 includes the P network element 1550 and the CE network element 1555. The CE network element 1530 is coupled with the PE network element 1535 over the AC N 1575, and the CE network element 1555 is coupled with the PE network element 1450 over the AC N 1585. The PE network elements 1535 and 1540 are coupled together over the PPW N 1580, which is carried across a PSN (not shown for simplicity purposes). The layer N network provides the PPW N 1580, which is a point to point (p2p) link in the layer N+1 network. The layer N+1 network provides the PPW PW N+1 1595, which is a p2p link in the layer N+2 network.

Figure 17:
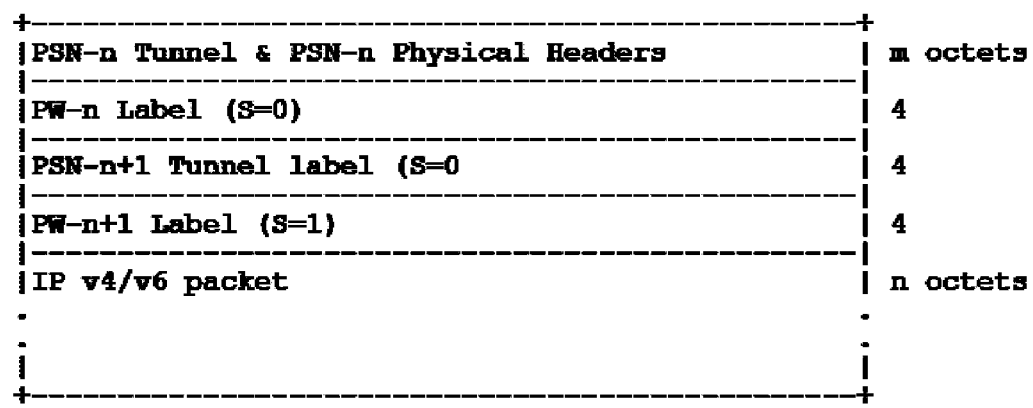
FIG. 17 illustrates an exemplary encapsulation format for the multi-layer network of FIG. 15 according to one embodiment of the invention.

FIG. 16 illustrates a prior art encapsulation format for the multi-layer network 1500 when all layers are based on RFC 4448 and the PSN tunnel at layer N+1 is an MPLS LSP. As illustrated in FIG. 16, the payload of the layer N+2 IP packet in the layer N PSN is encapsulated in multiple stacks requiring multiple data link layer headers. In contrast, FIG. 17 illustrates the efficient encapsulation format described herein for the multi-layer network 1500 when all layers are based on the format described herein (and assuming that control words is not needed and ECMP is based on the IP header). As illustrated in FIG. 17, the data link layer headers of layer N and N+1 are not included in the encapsulation format, saving at least between 28 and 44 bytes of data (depending on whether the attachment circuits are untagged, single tagged, or double tagged) as compared with the prior art encapsulation format of FIG. 16. Thus, the efficient encapsulation format described herein increases efficiency in multi-layer networks by reducing the overhead required to stack each layer (at least for IP and MPLS packets). This also reduces the possibility of fragmentation and assembly in multi-layer networks.

Figure 18:
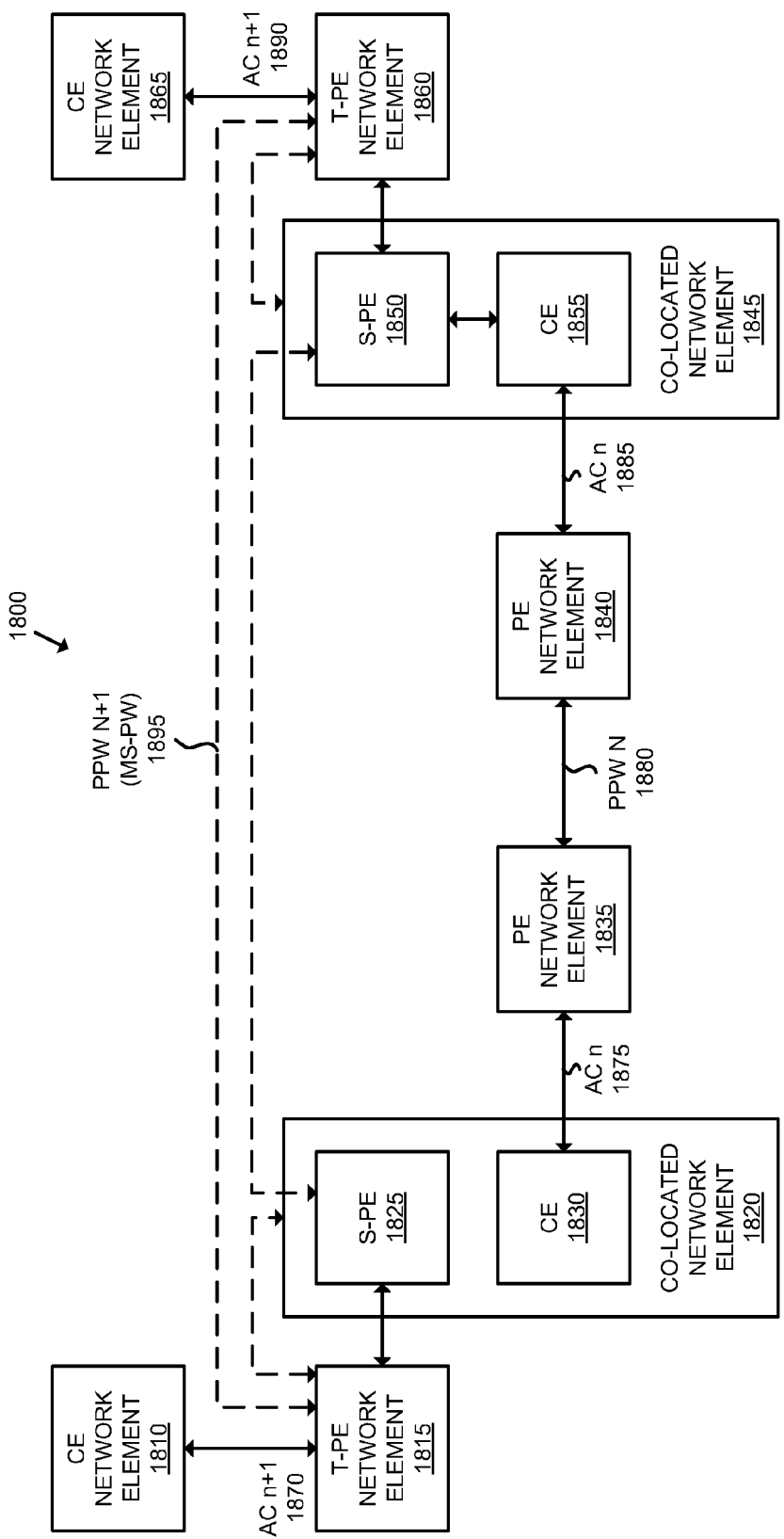
FIG. 18 illustrates a multi-layer network that uses a multi-segment pseudowire architecture that implements an efficient IP and MPLS encapsulation format on a PPW while allowing for other protocol types on the PPW, according to one embodiment of the invention.

As the number of layers in the network increase, an extra 8 bytes per layer (2 labels) is typically all that is required using the efficient encapsulation format described herein. In some embodiments, this is further reduced to an extra 4 bytes per layer by using multi-segment pseudowire (MS-PW) architecture (described in RFC 5659, "An Architecture for Multi-Segment Pseudowire Emulation Edge-to-Edge", October 2009) where each CE for a layer N network also functions as a switching PE (S-PE) at the layer N+1 network and the 1-hop PSN N+1 tunnel between such S-PEs is setup with PHP (Penultimate-Hop-Popping). FIG. 18 illustrates the network 1800 that is a multi-layer network that uses a multi-segment pseudowire architecture. The PPW N+1 (MS-PW) 1895 emulates a service between the CE network elements 180 and 1865. The CE network elements 1810 and 1865 are coupled with the terminating provider edge (T-PE) network elements 1815 and 1860 respectively over the AC N+1 1870 and AC N+1 1890 respectively. The T-PE network elements 1815 and 1860 are coupled with the S-PE network elements 1825 and 1850 respectively of the co-located network elements 1820 and 1845 respectively. The CE network elements 1830 and 1855 of the co-located network elements 1820 and 1845 are coupled with the PE network elements 1835 and 1840 respectively over the AC N 1875 and the AC N 1885 respectively. The PE network elements 1835 and 1840 are coupled together over the PPW N 1880, which is carried across a PSN (not shown for simplicity purposes). The PPW N+1 1895 from the T-PE network element 1815 to the T-PE network element 1860 has a segment from the S-PE network element 1825 to the S-PE network element 1850, and the 1-hop PSN tunnel in the layer N+1 network from the S-PE network element to the S-PE network element 1850 is setup with PHP.

Thus, an efficient IP and MPLS encapsulation format for a PPW is described which reduces the number of overhead bytes on the PPW, which results in a significant reduction in bandwidth (as a percentage of packet size). The reduction in overhead bytes for each packet also reduces the possibility of fragmentation and reassembly of large IP or MPLS packets, which improves the throughput of the network. For multi-layer networks, the efficient IP and MPLS encapsulation format reduces the overhead required to stack each layer and reduces the possibility of fragmentation and reassembly of large IP or MPLS packets.

In addition, the encapsulation format for a PPW described herein supports non-IP/MPLS packets while allowing ECMP to be performed by intermediate nodes based on IP, which reduces the requirement to implement a flow ordering technique (e.g., reduces the use of flow labels) by leveraging existing ECMP base on IP implementations. In addition, for multi-layer networks, ECMP is more efficient by enabling existing ECMP implementations (at any layer) to examine the label stack through all higher layers. The encapsulation format also allows existing implementations (at any layer) to examine the end-host's IP packet and simplifies deep-packet-inspection and/or flow-based applications.

In some embodiments, QoS (Quality of Service) considerations described in RFC 4448 area applicable to the encapsulation format described herein.

While embodiments have been described with the PPW supporting multiple protocols (IP, MPLS, and other protocol types), in some embodiments the packet transport service may only carry a subset of the packet types (e.g., an IP only scenario, an IP and ARP only scenario, an MPLS only scenario, an IP and MPLS only scenario, an IP, MPLS, and ARP only scenario, and a generic packet service scenario). For example, in an IP only scenario, the client network uses the PPW to exchange IP only packets. Such a scenario may occur when the PE and CE are co-located on the same network element at both ends of the PPW and the CE's exchange only IP packets on the PPW. In such a scenario, the MAC addresses of the CEs are not needed. Such an IP only scenario may also occur when the PE and CE are separate physical network elements where the CE network element's exchange only IP packets on the PPW and the MAC address mapping for the IP packets is configured on the CEs (e.g., static ARP entry). However, IP encapsulated control protocols (e.g., RIP, OSPF, etc.) may be carried on the PPW. The IP only scenario can be implemented using an IP only PPW, where only IP traffic is transported on the PPW (this PPW does not implement the GRE encapsulation).

In an IP and ARP only scenario, the client network uses the PPW to exchange IP packets but also uses ARP for layer-2 address resolution. The IP and ARP only scenario can be implemented using a generic PPW (capable of carrying all protocols) or it can be implemented using an IP only PPW if the PE network element acts as a proxy ARP gateway to its locally connected CE.

In an MPLS only scenario, the client network uses the PPW to exchange only MPLS packets. In such a scenario, the client network would be a purely MPLS (including MPLS-TP) network and would not use an IP based control plane. Such a scenario may occur when the PE and CE are co-located on the same network element at both ends of the PPW and the CE's exchange only MPLS packets on the PPW. In such a scenario, the MAC addresses of the CE's are not needed. This scenario may also occur when the PE and CE are separate physical network elements, where the client network uses the PPW to exchange MPLS (including MPLS-TP) packets and the mapping of MPLS-label to MAC address is configured on the CE. The MAC address may be from an assigned range (as defined in MPLS-TP). The MPLS only scenario can be implemented using an MPLS only PPW that carries only MPLS traffic (this PPW would not implement the GRE encapsulation described herein).

In an IP and MPLS only scenario, the client network uses the PPW to exchange IP and MPLS packets only. Such a scenario occurs when the PE and CE are co-located on the same network element on the both ends of the PPW and the CE transmits only IP and MPLS packets on the PPW. In such a scenario, the MAC addresses of the CE's are not needed. Such a scenario may also occur when the PE and CE are separate physical network elements but the MAC address mapping for IP and MPLS is configured on the CE (e.g., static ARP entry). However, IP encapsulated control protocols (e.g., RIP, OSPF, BGP, LDP, RSVP-TE, etc.) may be carried on the PPW. The IP and MPLS only scenario can be implemented using an IP and MPLS only PPW that carries IP and MPLS traffic only (this PPW would not implement the GRE encapsulation described herein).

In an IP, MPLS, and ARP only scenario, the client network uses the PPW to exchange IP and MPLS packets, and also uses ARP for layer-2 address resolution. Such a scenario can occur when the client network uses the PPW exclusively with the IP protocol for layer-3 routing, MPLS protocol for switching, and ARP for layer-2 address resolution. The IP, MPLS, and ARP only scenario can be implemented using a generic PPW (capable of carrying all protocols) or it can be implemented using an IP and MPLS only PPW if the PE network element acts as a proxy ARP gateway to its locally connected CE.

In a generic packet service scenario, the client network uses the PPW to exchange any type of packet that can be sent on an EVC. MAC address configuration is not necessary since ARP can be run on the PPW. The generic packet service scenario can be implemented using a generic PPW that is capable of carrying traffic of all protocols.

While embodiments have been described that describe an encapsulation format for IP and MPLS packets on a PPW that does not include the entire data link layer header, in other embodiments only a portion of the data link layer header for such packets is not included. For example, in one embodiment, only the destination MAC address of the data link layer header is removed from the data link layer header. For example, with reference to FIG. 1, the PE network element 120 may include the source MAC address of the CE network element 110 in the PPW packet 160. As another example, for a PPW where control word processing is not established, instead of transmitting the entire VLAN tag stack, only the top-most subset of the VLAN tag stack is transmitted on the PPW, and the CE traffic bound PE network element maps the top-most subset to the entire VLAN tag stack prior to transmitting the frame to its local CE network element.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A first provider edge network element to be coupled with a customer edge network element over an attachment circuit and the first provider edge network element also to be coupled with a second provider edge network element over a packet-pseudowire over a tunnel in a Packet Switched Network (PSN), the first provider edge network element to reduce the size of protocol data units with IP (Internet Protocol) and MPLS (Multiprotocol Label Switching) packet payloads carried on the packet-pseudowire, the first provider edge network element comprising:

a provider edge bound EIM (Efficient IP MPLS) module configured to receive frames transmitted from the customer edge network element over the attachment circuit, the provider edge bound EIM module including:

a parsing module configured to parse the received frames to determine a protocol type of packets encapsulated in the frames, to pass those of the frames that encapsulate IP packets to an IP packet-pseudowire encapsulation module, to pass those of the frames that encapsulate MPLS packets to an MPLS packet-pseudowire encapsulation module, wherein each of the frames includes a data link layer header including a plurality of fields, and wherein the parsing module is further configured to pass those of the frames that encapsulate one of non-IP and non-MPLS ("non-IP/MPLS") packets to a non-IP/MPLS packet-pseudowire encapsulation module, wherein the non-IP/MPLS packet-pseudowire encapsulation module is configured to encapsulate non-IP/MPLS packets for transmission over the packet-pseudowire over the PSN tunnel to the second provider edge network element in a format that includes all of the fields of the data link layer header of that non-IP/MPLS packet, the IP packet-pseudowire encapsulation module configured to encapsulate IP packets into protocol data units for transmission on the packet-pseudowire over the PSN tunnel to the second provider edge network element in a format that does not include any all of the fields of the data link layer header that corresponds to the IP packets, and the MPLS packet-pseudowire encapsulation module configured to encapsulate MPLS packets into protocol data units for transmission on the packet-pseudowire over the PSN tunnel to the second provider edge network element in a format that does not include any all of the fields of the data link layer header that corresponds to the MPLS packets; and a transmission module to transmit the protocol data units on the packet-pseudowire over the PSN tunnel to the second provider edge network element.

2. The first provider edge network element of claim 1, wherein the IP packet-pseudowire encapsulation module is further configured to set, for each IP packet to be encapsulated for transmission over the packet-pseudowire when control word processing is established for the packet-pseudowire, one or more flag bits of a control word to a predetermined value to indicate that the payload carried on the packet-pseudowire is IP.

3. The first provider edge network element of claim 1, wherein the MPLS packet-pseudowire encapsulation module is further configured to set, for each MPLS packet to be encapsulated for transmission over the packet-pseudowire when control word processing is established for the packet-pseudowire, one or more flag bits of a control word to a predetermined value to indicate that the payload carried on the packet-pseudowire is MPLS.

4. The first provider edge network element of claim 1, wherein the non IP/MPLS packet-pseudowire encapsulation module is further configured to encapsulate the frames into GRE (Generic Routing Encapsulation) packets using IP as a delivery protocol when control word processing is not established for the packet-pseudowire, and wherein an IP destination address in a delivery header of each GRE packet is a non-routable address.

5. A method in a first provider edge network element for processing protocol data units received on a packet-pseudowire in a Packet Switched Network (PSN), wherein the first provider edge network element is coupled with a first customer edge network element over a first attachment circuit and the first provider edge network element is also coupled with a second provider edge network element over the packet-pseudowire, and wherein the second provider edge network element is coupled with a second customer edge network element over a second attachment circuit, the method comprising the steps of:

receiving a first protocol data unit on the packet-pseudowire that was generated by the second provider edge network element responsive to the second provider edge network element receiving a first frame from the second customer edge network element over the second attachment circuit, wherein all of the fields of a data link layer header have been omitted from the first protocol data unit, and wherein a MAC (Media Access Control) address of the second customer edge network element corresponding to the second attachment circuit and a MAC address of the first customer edge network element corresponding to the first attachment circuit are stored on the first provider edge network element; and responsive to determining that a packet encapsulated in the first protocol data unit is one of an IP (Internet Protocol) packet and an MPLS (Multiprotocol Label Switching) packet, performing the following steps:

mapping the packet into a second frame by adding all of those fields of the data link layer header that were omitted from the first protocol data unit, and transmitting the second frame over the first attachment circuit to the first customer edge network element.

6. The method of claim 5, further comprising the steps of:

receiving a second protocol data unit on the packet-pseudowire that was generated by the second provider edge network element responsive to the second provider edge network element receiving a third frame from the second customer edge network element, wherein the second protocol data unit includes all of the fields of a data link layer header;

responsive to determining that a packet encapsulated in the second protocol data unit is a GRE (Generic Routing Encapsulation) packet using IP as a delivery protocol, performing the following step:

responsive to validating a VLAN (Virtual Local Area Network) identifier of an Ethernet frame encapsulated in the GRE packet with a VLAN identifier associated with the second attachment circuit, passing the GRE packet to a native service processor unit for further processing for transmission to the first customer edge network element over the first attachment circuit.

7. The method of claim 5, wherein the step of mapping the packet into the second frame includes performing the following step:

responsive to determining that the packet encapsulated in the first data unit is an MPLS packet, performing the following steps:

setting a source MAC address in the data link layer header of the second frame to the MAC address of the second customer edge network element, setting a destination MAC address in the data link layer header of the second frame to the MAC address of the first customer edge network element, and setting an Ethernet type field in the data link layer header of the second frame to indicate that an MPLS packet is encapsulated in the second frame.

8. The method of claim 5, wherein the step of mapping the packet into the second frame includes performing the following step:

responsive to determining that the packet encapsulated in the first protocol data unit is an IP packet and has a destination IP address that is routable, performing the following steps:

setting a source MAC (Media Access Control) address in the data link layer header of the second frame to the MAC address of the second customer edge network element, responsive to determining that the packet is a multicast or broadcast packet, setting a destination MAC address in the data link layer header of the second frame to a MAC address that identifies a multicast or broadcast address respectively, responsive to determining that the packet is a unicast packet, setting a destination MAC address in the data link layer header of the second frame to the MAC address of the first customer edge network element, and setting an Ethernet type field in the data link layer header of the second frame to indicate that an IP packet is encapsulated in the first frame.

9. A first provider edge network element, which is to be coupled between a first customer edge network element over an attachment circuit and a second provider edge network element over a packet-pseudowire in a Packet Switched Network (PSN), to process protocol data units received on the packet-pseudowire, the first provider edge network element comprising:

a customer edge bound EIM (Efficient IP MPLS) module configured to receive protocol data units on the packet-pseudowire that were generated by the second provider edge network element responsive to the second provider edge network element receiving frames from a second customer edge network element, the customer edge bound EIM module including:

a parsing module configured to parse the protocol data units to determine a protocol type of a packet payload of the protocol data units, to pass those of the frames that have IP packet payloads with routable destination IP addresses to an IP Ethernet mapping module, and to pass those of the frames that have MPLS packet payloads are passed to an MPLS Ethernet mapping module, wherein all of the plurality of fields of a data link layer header have been omitted from the protocol data units that have MPLS packet payloads and from the protocol data units that have IP packet payloads, the IP Ethernet mapping module configured to map IP packet payloads having a routable destination IP address into Ethernet frames for transmission to the first customer edge network element over the attachment circuit by reconstructing all of the omitted fields of the data link layer header for the IP packets, and the MPLS Ethernet mapping module configured to map MPLS packet payloads into Ethernets frame for transmission to the first customer edge network element over the attachment circuit by reconstructing all of the omitted fields of the data link layer header for the MPLS packets.

10. The first provider edge network element of claim 9, wherein the customer edge bound EIM module further includes a GRE (Generic Routing Encapsulation) module to process GRE packets using IP as a delivery protocol received on the packet-pseudowire, wherein GRE packet payloads encapsulate non-IP/MPLS protocols, and wherein GRE packet payloads include data link layer headers.

11. The first provider edge network element of claim 9, wherein the customer edge bound EIM module further includes a data link layer header information store configured to store data link layer header information of the first customer edge network element and the second customer edge network element including a respective MAC (Media Access Control) address of the first and second customer edge network element.

12. The first provider edge network element of claim 11, wherein the MPLS Ethernet mapping module is configured to reconstruct a data link layer header for each MPLS packet payload by setting a source MAC address to the MAC address of the second customer edge network element and setting a destination MAC address to the MAC address of the first customer edge network element.

13. The first provider edge network element of claim 11, wherein the IP Ethernet mapping module is configured to reconstruct a data link layer header for each unicast IP packet payload by setting a source MAC address to the MAC address of the second customer edge network element and setting a destination MAC address to the MAC address of the first customer edge network element.

* * * * *

UNITED STATES PATENT AND TRADEMARK OFFICE
CERTIFICATE OF CORRECTION

| | |
|---|---|
| PATENT NO. | : 8,472,438 B2 |
| APPLICATION NO. | : 12/824072 |
| DATED | : June 25, 2013 |
| INVENTOR(S) | : Kini et al. |

Page 1 of 1

It is certified that error appears in the above-identified patent and that said Letters Patent is hereby corrected as shown below:

On Title Page 2, in Item (56), under "OTHER PUBLICATIONS", in Column 2, Line 13, delete "routeing" and insert -- routing --, therefor.

In the Drawings:

In Fig. 17, Sheet 15 of 16, in Line 3, delete "(S=0" and insert -- (S=0) --, therefor.

In the Specification:

In Column 16, Line 32, delete "PPW PW N+1" and insert -- PPW N+1 --, therefor.

Signed and Sealed this
Twenty-ninth Day of October, 2013

Teresa Stanek Rea
*Deputy Director of the United States Patent and Trademark Office*